United States Patent
Kim et al.

(10) Patent No.: US 11,385,687 B1
(45) Date of Patent: Jul. 12, 2022

(54) HINGE STRUCTURE AND ELECTRONIC DEVICE INCLUDING THE SAME

(71) Applicant: Samsung Electronics Co., Ltd., Suwon-si (KR)

(72) Inventors: Jongkeun Kim, Suwon-si (KR); Hyungsoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/520,158

(22) Filed: Nov. 5, 2021

Related U.S. Application Data

(63) Continuation of application No. 17/436,902, filed as application No. PCT/KR2021/011667 on Aug. 31, 2021.

(30) Foreign Application Priority Data

Jan. 29, 2021 (KR) .................. 10-2021-0013068

(51) Int. Cl.
*G06F 1/16* (2006.01)
*E05D 3/12* (2006.01)
(Continued)

(52) U.S. Cl.
CPC ............ *G06F 1/1681* (2013.01); *F16C 11/04* (2013.01); *G06F 1/1641* (2013.01);
(Continued)

(58) Field of Classification Search
CPC combination set(s) only.
See application file for complete search history.

(56) References Cited

U.S. PATENT DOCUMENTS 9,115,750 B2 * 8/2015 Park .................. G06F 1/1637
9,845,625 B2 * 12/2017 Park .................. F16C 11/04
(Continued)

FOREIGN PATENT DOCUMENTS

CN 207111694 U 3/2018
CN 211018886 U 7/2020
(Continued)

OTHER PUBLICATIONS

International Search Report with Written Opinion and English translation dated Nov. 29, 2021; International Appln. No. PCT/KR2021/011667.
(Continued)

*Primary Examiner* — Lisa Lea-Edmonds
(74) *Attorney, Agent, or Firm* — Jefferson IP Law, LLP

(57) ABSTRACT

An electronic device is provided. The electronic device includes a first housing, a second housing, a hinge structure configured to connect the first housing and the second housing, and a foldable display module. The hinge structure includes a rotating shaft, a first idle gear, a second idle gear, a first gear, a second gear, a first pressing member configured to move the first gear toward the second gear, and a first interconnecting structure formed between the first gear and the second gear to enable the first gear to engage with the second gear, the first interconnecting structure being formed between the first gear and the second gear such that, as first pressing member moves the first gear toward the second gear, the first gear and the second gear receive with rotational forces in opposite directions.

22 Claims, 21 Drawing Sheets

(51) Int. Cl.
*F16C 11/04* (2006.01)
*H04M 1/02* (2006.01)

(52) U.S. Cl.
CPC ............ *G06F 1/1652* (2013.01); *E05D 3/122* (2013.01); *E05Y 2900/606* (2013.01); *H04M 1/0268* (2013.01)

(56) References Cited

U.S. PATENT DOCUMENTS

| | | | |
|---|---|---|---|
| 10,120,415 B2* | 11/2018 | Seo | G06F 1/1652 |
| 10,303,223 B2* | 5/2019 | Park | E05D 3/122 |
| 10,775,852 B2* | 9/2020 | Kim | H05K 5/0226 |
| 11,003,222 B2* | 5/2021 | Moon | G06F 1/1618 |
| 11,032,929 B2* | 6/2021 | Yoo | E05D 3/18 |
| 11,061,445 B2* | 7/2021 | Kim | G06F 1/1681 |
| 11,073,863 B2* | 7/2021 | Kim | G06F 1/1652 |
| 2013/0322004 A1 | 12/2013 | Park | |
| 2018/0324964 A1 | 11/2018 | Yoo et al. | |
| 2019/0163241 A1* | 5/2019 | Moon | G06F 1/1641 |
| 2019/0166703 A1* | 5/2019 | Kim | G06F 1/1681 |
| 2020/0264673 A1* | 8/2020 | Kim | G06F 1/1641 |
| 2020/0267859 A1 | 8/2020 | Kim et al. | |
| 2020/0348732 A1 | 11/2020 | Kang et al. | |
| 2020/0375046 A1 | 11/2020 | Sim et al. | |
| 2020/0383215 A1* | 12/2020 | Kim | G06F 1/1652 |
| 2021/0076511 A1* | 3/2021 | Yang | G09F 9/301 |
| 2021/0141422 A1* | 5/2021 | Seo | G06F 1/1652 |
| 2021/0149436 A1* | 5/2021 | Myung | H04M 1/0222 |
| 2021/0165466 A1* | 6/2021 | Kang | E05D 3/18 |
| 2021/0223827 A1* | 7/2021 | Moon | G06F 1/1647 |
| 2021/0247815 A1* | 8/2021 | Shim | G06F 1/1652 |
| 2021/0255672 A1* | 8/2021 | Kim | G06F 1/1652 |
| 2021/0298186 A1* | 9/2021 | Yoo | G06F 1/1656 |
| 2021/0373609 A1* | 12/2021 | Kim | F16M 11/10 |
| 2021/0373614 A1* | 12/2021 | Kim | H04M 1/0216 |

FOREIGN PATENT DOCUMENTS

| | | |
|---|---|---|
| EP | 3 734 946 A1 | 11/2020 |
| KR | 10-2013-0134648 A | 12/2013 |
| KR | 10-2020-0101239 A | 8/2020 |
| KR | 10-2020-0101241 A | 8/2020 |
| KR | 10-2174853 B1 | 11/2020 |
| KR | 10-2020-0135636 A | 12/2020 |
| WO | 2019/223054 A1 | 11/2019 |

OTHER PUBLICATIONS

Extended European Search Report dated Jun. 3, 2022, issued in European Patent Application No. 22153985.1.

* cited by examiner (a)

(b)

HINGE STRUCTURE AND ELECTRONIC DEVICE INCLUDING THE SAME

CROSS-REFERENCE TO RELATED APPLICATION(S)

This application is a continuation application of prior application Ser. No. 17/436,902, filed on Sep. 7, 2021, which is a U.S. National Stage application under 35 U.S.C. § 371 of an International application number PCT/KR2021/011667, filed on Aug. 31, 2021, which is based on and claims priority of a Korean patent application number 10-2021-0013068, filed on Jan. 29, 2021, in the Korean Intellectual Property Office, the disclosure of which is incorporated by reference herein in its entirety.

TECHNICAL FIELD

Various embodiments disclosed herein relate to a hinge structure and an electronic device including a hinge structure.

BACKGROUND ART

Hinge structures are used across various industries as structures for rotatably connecting mechanical elements. For example, a hinge structure may be applied to a foldable electronic device.

Various types of hinge structures exist. For example, a hinge structure including multiple gears meshing with each other may be used to sustain continuous rotations of mechanical elements.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Gears ideally meshing with each other may operate while completely meshing with no clearance. However, respective gears may develop small tolerances manufacturing processes thereof.

Such gear tolerances may result in small gaps between gear teeth. In other words, complete gear meshing may not be guaranteed. It is only after a rotation for compensating for the gap between gear teeth that the gears can mesh and rotate. During the process of rotation for compensating for gaps, power may not be transferred to adjacent gears, which may then rotate idly.

Particularly, idle rotation of gears may occur when the gear direction switches. In addition, the more interworking gears, the large amount of idle rotation accumulated, thereby causing a substantial delay between the start gear and the end gear.

Various embodiments disclosed herein may provide a hinge structure capable of providing stable a hinge operation and an electronic device including the hinge structure.

Solution to Problem

In accordance with an aspect of the disclosure, an electronic device is provided. The electronic device includes a first housing, a second housing, a hinge structure configured to foldably connect the first housing and the second housing, and a display module arranged in the first housing and the second housing such that a partial area thereof is folded by folding of the first housing and the second housing, wherein the hinge structure includes a rotating shaft, a first idle gear configured to rotate together with the rotating shaft, a second idle gear configured to rotate together with the rotating shaft and arranged side by side with the first idle gear, a first gear engaged with the first idle gear from a first direction with respect to the rotating shaft, a second gear engaged with the second idle gear from the first direction with respect to the rotating shaft, a first pressing member configured to move the first gear and the second gear toward each other, and a first interconnecting structure formed between the first gear and the second gear to enable the first gear and the second gear to engage each other, the first interconnecting structure being formed between the first gear and the second gear such that, as the first pressing member moves the first gear and the second gear toward each other, the first gear and the second gear receive rotational forces in opposite directions.

In accordance with another aspect of the disclosure, a hinge structure is provided. The hinge structure includes a rotating shaft, a first idle gear configured to rotate together with the rotating shaft, a second idle gear configured to rotate together with the rotating shaft and arranged side by side with the first idle gear, a first gear engaged with the first idle gear from a first direction with respect to the rotating shaft, a second gear engaged with the second idle gear from the first direction with respect to the rotating shaft, a first pressing member configured to move the first gear and the second gear toward each other, and a first interconnecting structure formed between the first gear and the second gear to enable the first gear and the second gear to engage each other, the first interconnecting structure being formed between the first gear and the second gear such that, as the first pressing member moves the first gear and the second gear toward each other, the first gear and the second gear receive rotational forces in opposite directions.

Advantageous Effects of Invention

According to various embodiments disclosed herein, problems resulting from hinge clearances due to gear tolerances may be alleviated, and the product yield may be improved by lowering the defective ratio. Delayed hinge operations due to gaps between gear teeth may be alleviated, thereby providing improved usability.

BRIEF DESCRIPTION OF DRAWINGS

In connection with the description of the drawings, like or similar reference numerals will be understood to refer to like or similar elements.

MODE FOR THE INVENTION

Figure 1:
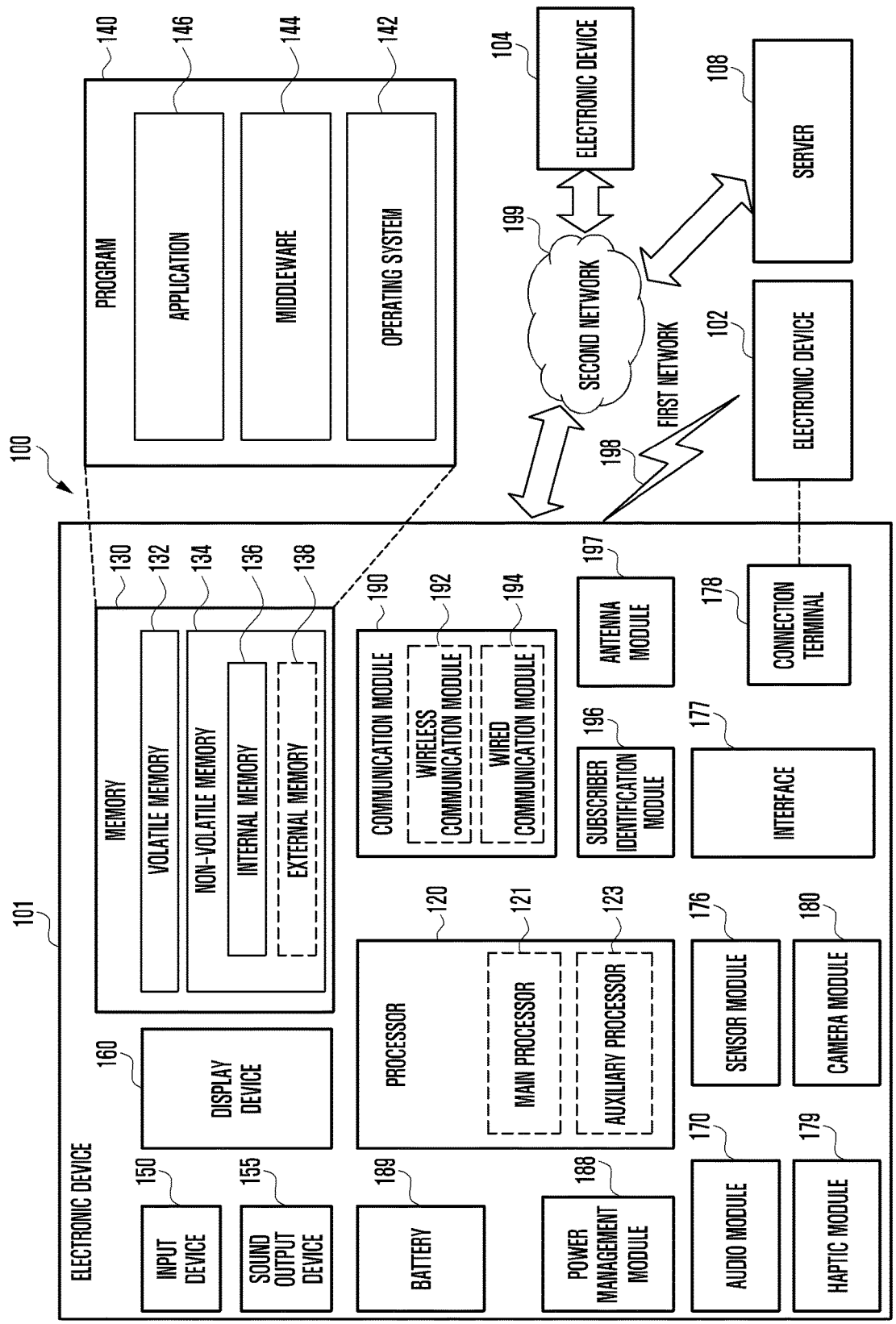
FIG. 1 is a block diagram illustrating an electronic device in a network environment according to various embodiments.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

In addition, the combination of features as shown in and explained in connection with the drawings should not be understood as limiting the invention as such (in particular not to those features which are not part of the independent claims) but should nevertheless be understood to be disclosed as specific combinations of features as shown in those drawings.

Various respective aspects and features of the invention are defined in the appended claims. Combinations of features from the dependent claims may be combined with features of the independent claims as appropriate and not merely as explicitly set out in the claims.

Furthermore, one or more selected features of any one embodiment described in this disclosure may be combined with one or more selected features of any other embodiment described herein, provided that the alternative combination of features at least partially alleviates the one or more technical problem discussed in this disclosure or at least partially alleviates a technical problem discernable by the skilled person from this disclosure and further provided that the particular combination or permutation of embodiment features thus formed would not be understood by the skilled person to be incompatible.

Two or more physically distinct components in any described example implementation of this disclosure may alternatively be integrated into a single component where possible, provided that the same function is performed by the single component thus formed. Conversely, a single component of any embodiment described in this disclosure may alternatively be implemented as two or more distinct components to achieve the same function, where appropriate.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory may include internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., by wire) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
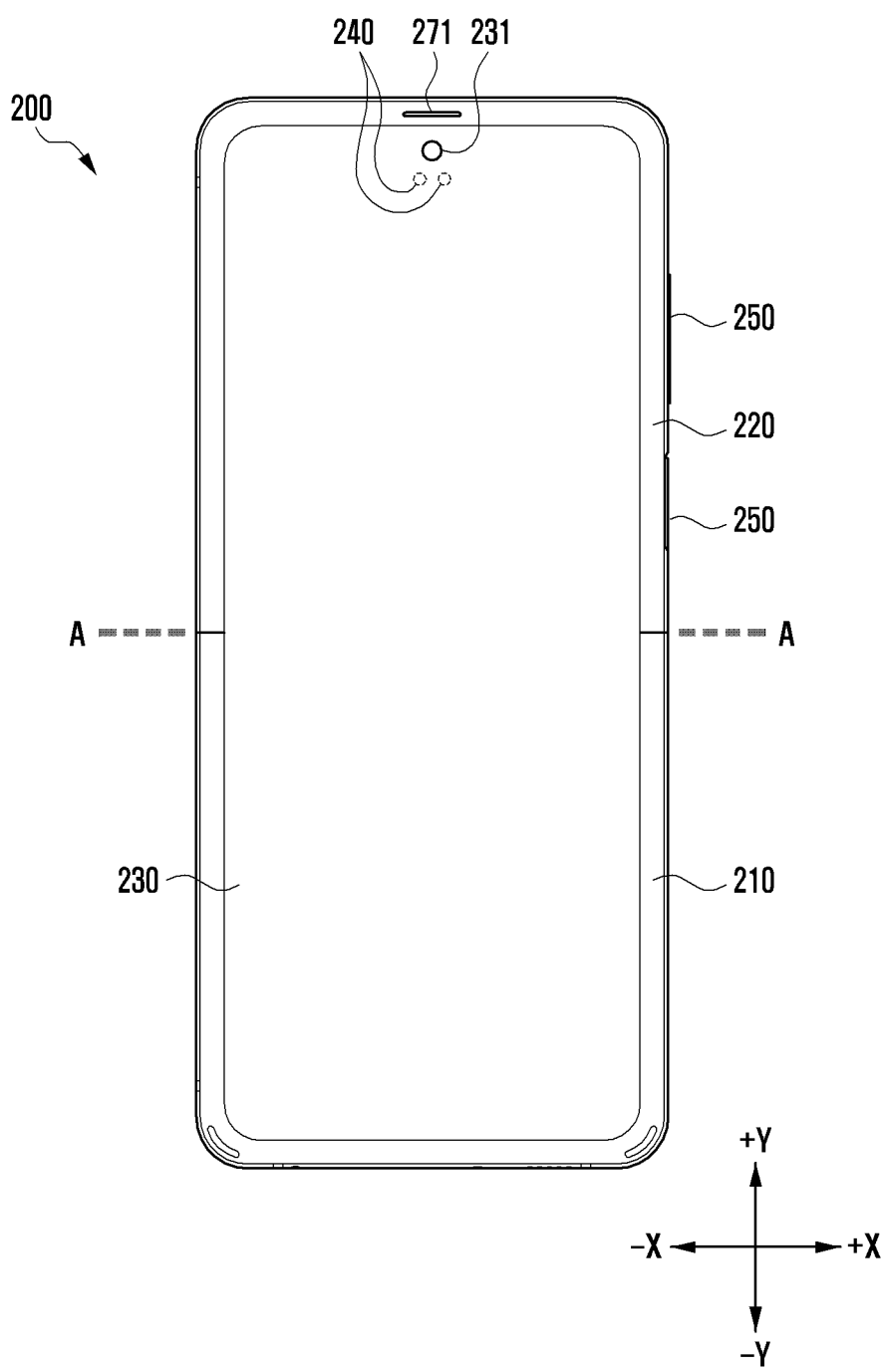
FIG. 2A is a front view showing an electronic device according to various embodiments of the disclosure.
Figure 2B:
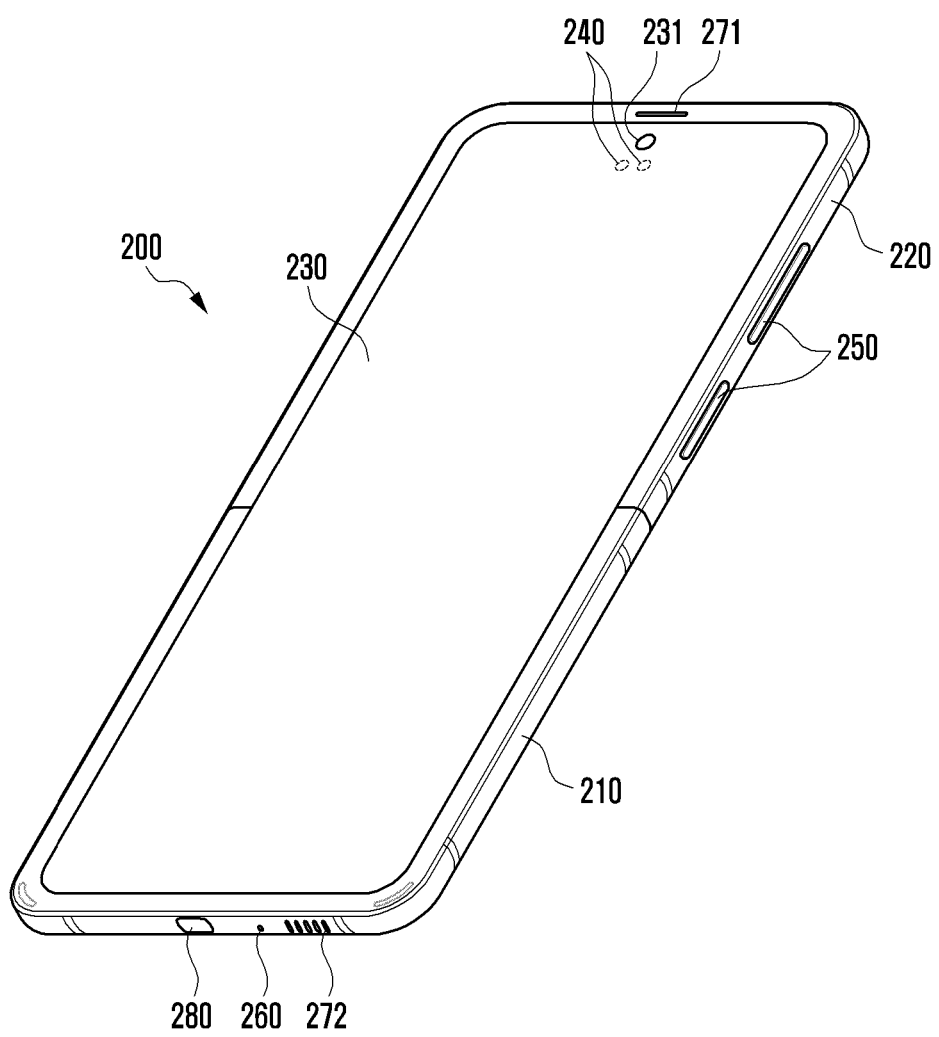
FIG. 2B is a perspective view showing an electronic device according to various embodiments of the disclosure.
Figure 2C:
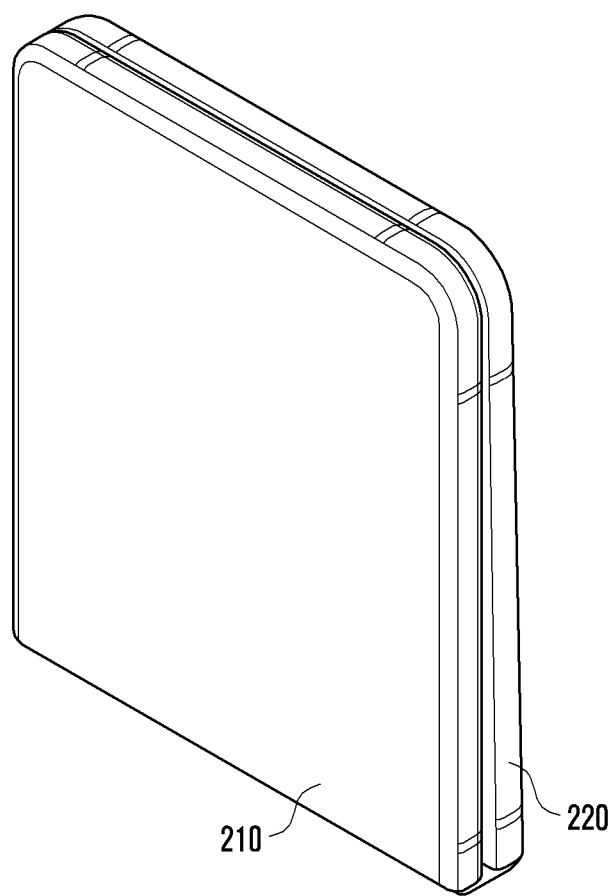
FIG. 2C is a perspective view showing a folded state of an electronic device according to various embodiments of the disclosure.

FIG. 2A is a front view showing an electronic device according to various embodiments of the disclosure. FIG. 2B is a perspective view showing an electronic device according to various embodiments of the disclosure. FIG. 2C is a perspective view showing a folded state of an electronic device according to various embodiments of the disclosure.

According to various embodiments, an electronic device 200 illustrated in FIGS. 2A to 2C may be an embodiment of the electronic device 101 previously described through FIG. 1. The electronic device 200, to be hereinafter described, may include at least a part of the elements illustrated in FIG. 1.

The electronic device 200 may include a first housing 210 and a second housing 220. The first housing 210 and the second housing 220 may be foldably connected to each other. For example, as illustrated in FIG. 2C, the shape of the electronic device 200 can be changed by folding of the first housing 210 and the second housing 220. According to an embodiment of the disclosure, the first housing 210 and the second housing 220 may be folded with reference to an axis (e.g., the A-A axis of FIG. 2A) side by side with the width direction (e.g., the X axis direction of FIG. 2A) of the electronic device 220. According to another embodiment of the disclosure, it is possible that the first housing 210 and the second housing 220 are folded with reference to an axis side by side with the lengthwise direction (e.g., the Y axis of FIG. 2A) of the electronic device 200. According to another embodiment of the disclosure, it is possible that the electronic device 200 includes more than three housings that may be foldably connected to each other with reference to a plurality of axes. For example, the electronic device 200 may include three housings, with first and second of the three housings being foldable with reference to a first axis side by side with the width direction (e.g., the X axis direction of FIG. 2A) of the electronic device 220, and with second and third of the three housings being foldable with reference to a second axis side by side with the width direction (e.g., the X axis direction of FIG. 2A) of the electronic device 220. Here, the first and third of the three housings may fold onto one side of the second housing, or the first of the three housings may fold onto one side of the second housing and the third of the three housings may fold onto another side of the second housing. For another example, the electronic device 200 may include three housings, with first and second of the three housings being foldable with reference to a first axis side by side with the width direction (e.g., the X axis direction of FIG. 2A) of the electronic device 220, and with second and third of the three housings being foldable with reference to a second axis side by side with the lengthwise direction (e.g., the Y axis of FIG. 2A) of the electronic device 220. Here, the first and third of the three housings may fold onto one side of the second housing, or the first of the three housings may fold onto one side of the second housing and the third of the three housings may fold onto another side of the second housing.

The electronic device 200 may include a display module 230 (e.g., the display module 160 of FIG. 1) supported by the first housing 210 and the second housing 220. The display module 230 may include all types of devices capable of displaying visual information. In one embodiment, at least a part of the display module 230 may be folded by folding of the first housing 210 and the second housing 220. A folding of the display module 230 may include both a completely folded deformation and a bent deformation while maintaining a predetermined curvature. According to another embodiment of the disclosure, the display module 230 may only be supported by one of the first housing 210 or the second housing 220. According to another embodiment of the disclosure the display module 230 may only be supported by one of the first housing 210 or the second housing 220, and another display module 230 may only be supported by the other one of the first housing 210 or the second housing 220.

According to various embodiments, the display module 230 may be a flexible display, at least a part of which is configured to be folded. In one embodiment, a substrate of the display module 230 may be formed of a flexible material. For example, the substrate of the display module 230 may be formed of a polymer material such as a polyethylene terephthalate (PET) or a polyimide (PI), or a glass processed to have a very thin thickness.

Referring to the embodiment of FIG. 2C, in a folded state of the electronic device 200, the first housing 210 and the second housing 220 may be folded to a state of (substantially) facing each other. Thus, the portability of the electronic device 200 can be enhanced by folding of the electronic device 200, and thus it may be possible to manufacture the electronic device 200 including the display module 230 having a large area to be more compact. In addition, in the folded state as illustrated in FIG. 2C, the damage or contamination of the display module 230 can be prevented due to the reduction of a portion in which the display module 230 is exposed to the outside.

According to another embodiment of the disclosure, when the electronic device 200 is in the folded state, the display module 230 may be disposed so as to remain visible on both sides of the electronic device 200 in the folded state.

According to various embodiments, the display module 230 may include a hole 231 for transmitting external light to exposing to light a camera module (e.g., the camera module 180 of FIG. 1) which may be disposed on the rear surface of the display module 230. For example, as illustrated in FIG. 2A, the hole 231 for transmitting light to the camera module may be located at the upper end part of the display module 230. In one embodiment, various sensor modules 240 for sensing electromagnetic radiation (e.g., an infrared sensor and an illuminance sensor) related to light are disposed around the hole 231.

According to various embodiments, the electronic device 200 may include a one or more physical buttons 250 which may be pushed by means of external force to generate an electrical signal. For example, as illustrated in referring to FIG. 2A and FIG. 2B, at least one physical button 250 may be disposed on a side surface of the electronic device 200.

According to various embodiments, the electronic device 200 may include a microphone hole 260 and speaker holes 271 and 272. A microphone for acquiring an external sound may be disposed in the microphone hole 260, and, in some embodiments, multiple microphones may be arranged to detect the direction of a sound. The speaker holes 271 and 272 may include an external speaker hole 271 and a receiver hole 272 for a call. In some embodiments, the speaker holes 272 and 271 and the microphone hole 260 may be implemented as one hole, or only a speaker may be included without the speaker holes 271 and 272 (e.g., a piezo speaker).

According to various embodiments, the electronic device 200 may include a connection interface 280 (e.g., the interface 177 of FIG. 1). The connection interface 280 may include, for example, at least one of a high definition multimedia interface (HDMI), a universal serial bus (USB) interface, an SD card interface, and/or an audio interface. In one embodiment, the connection interface 280 may electrically or physically connect the electronic device 200 to an external electronic device and include a USB connector, a SD card/multimedia card (MMC) connector, or an audio connector. For example, as illustrated in FIG. 2B, a connector 280 that can be connected to an external electronic device (e.g., another electronic device, a charging device, an audio device, etc.) is disposed on the bottom end part of the electronic device 200.

Figure 3A:
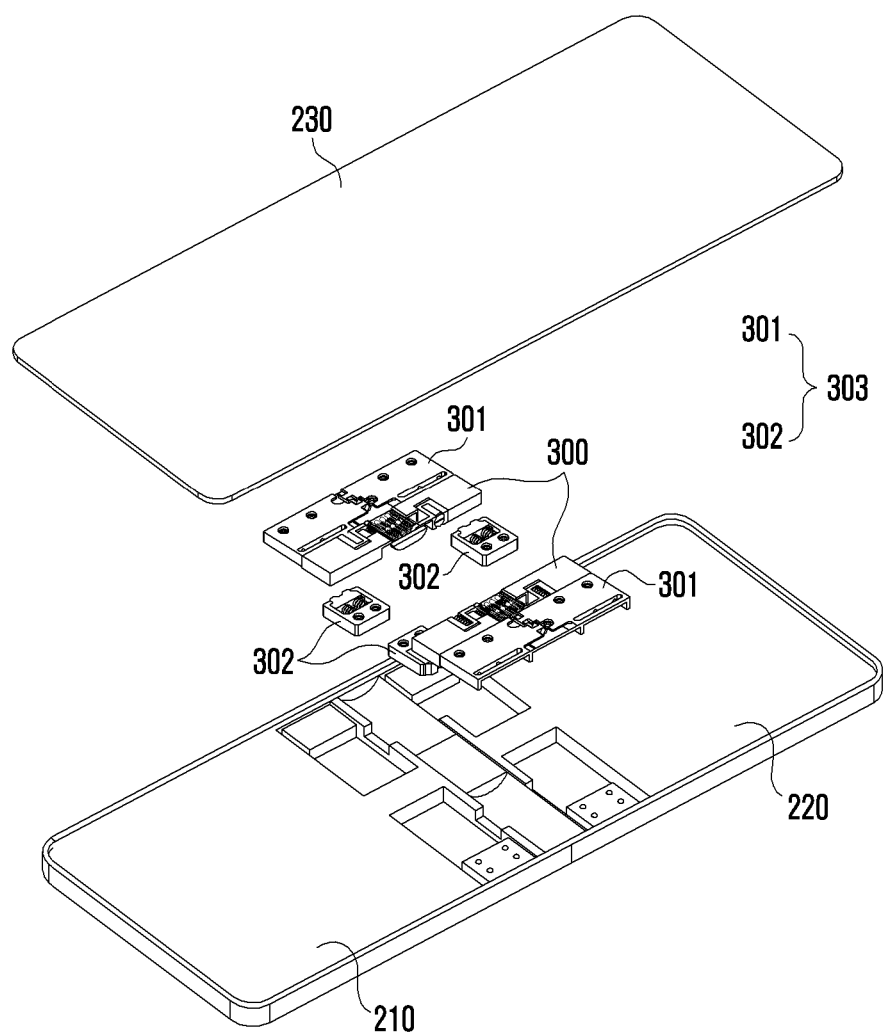
FIG. 3A is an exploded perspective view showing an electronic device according to various embodiments of the disclosure.
Figure 3B:
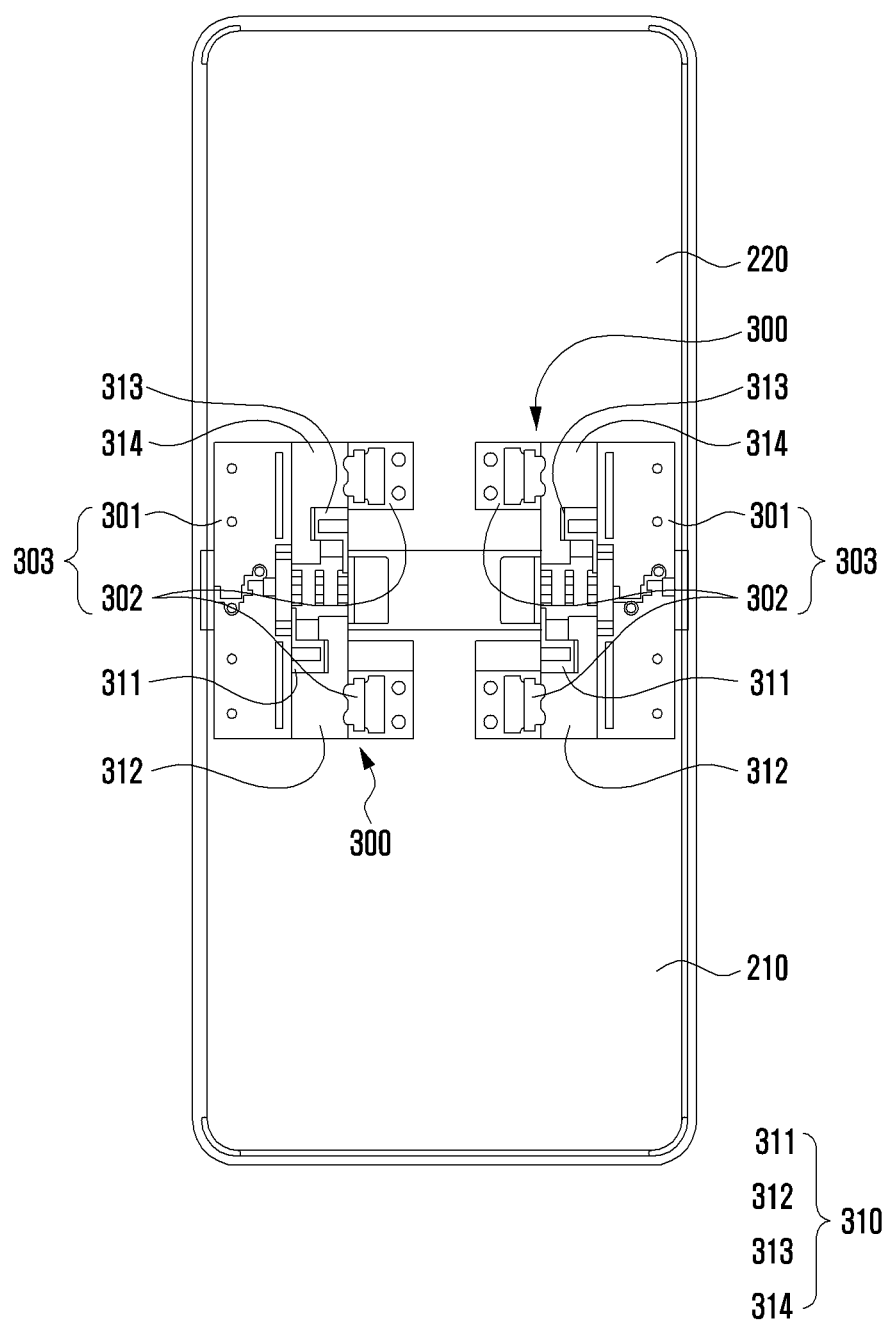
FIG. 3B is a front view showing a state in which a display module is removed from an electronic device according to various embodiments of the disclosure.
Figure 4A:
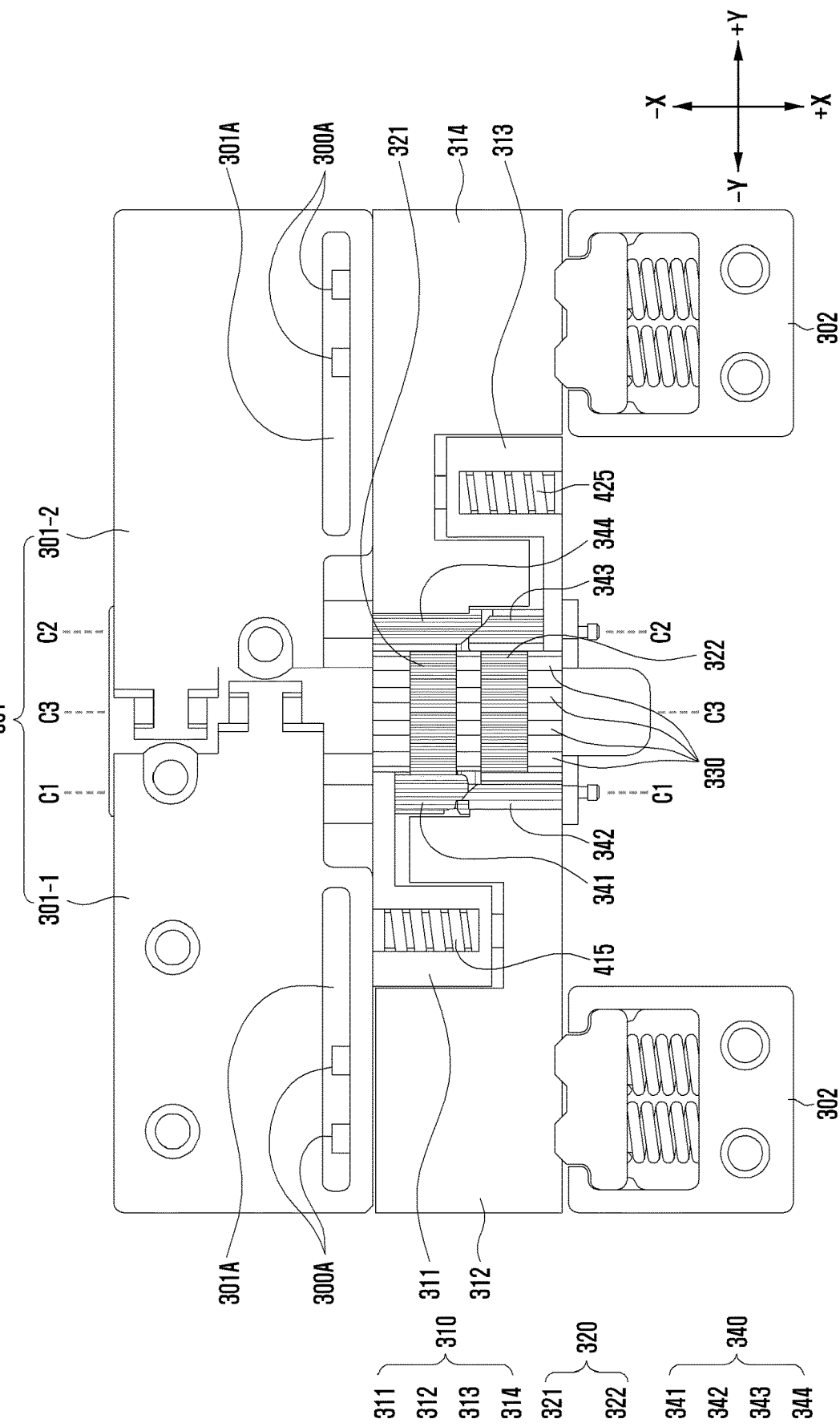
FIG. 4A is a plan view showing a hinge structure and peripheral elements thereof in an unfolded state of electronic device according to various embodiments of the disclosure.
Figure 4B:
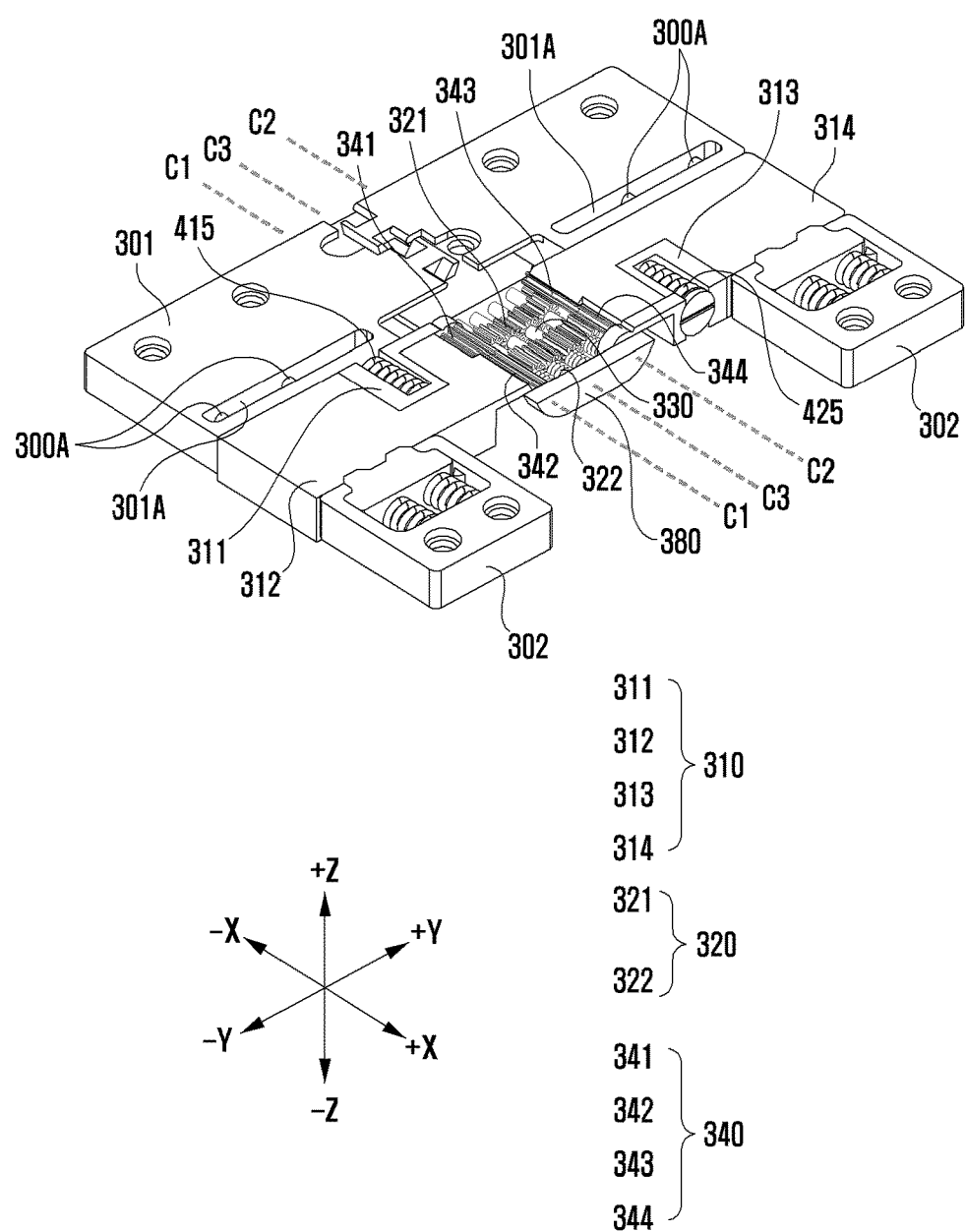
FIG. 4B is a perspective view showing a hinge structure and peripheral elements thereof in an unfolded state of electronic device according to various embodiments of the disclosure.
Figure 4C:
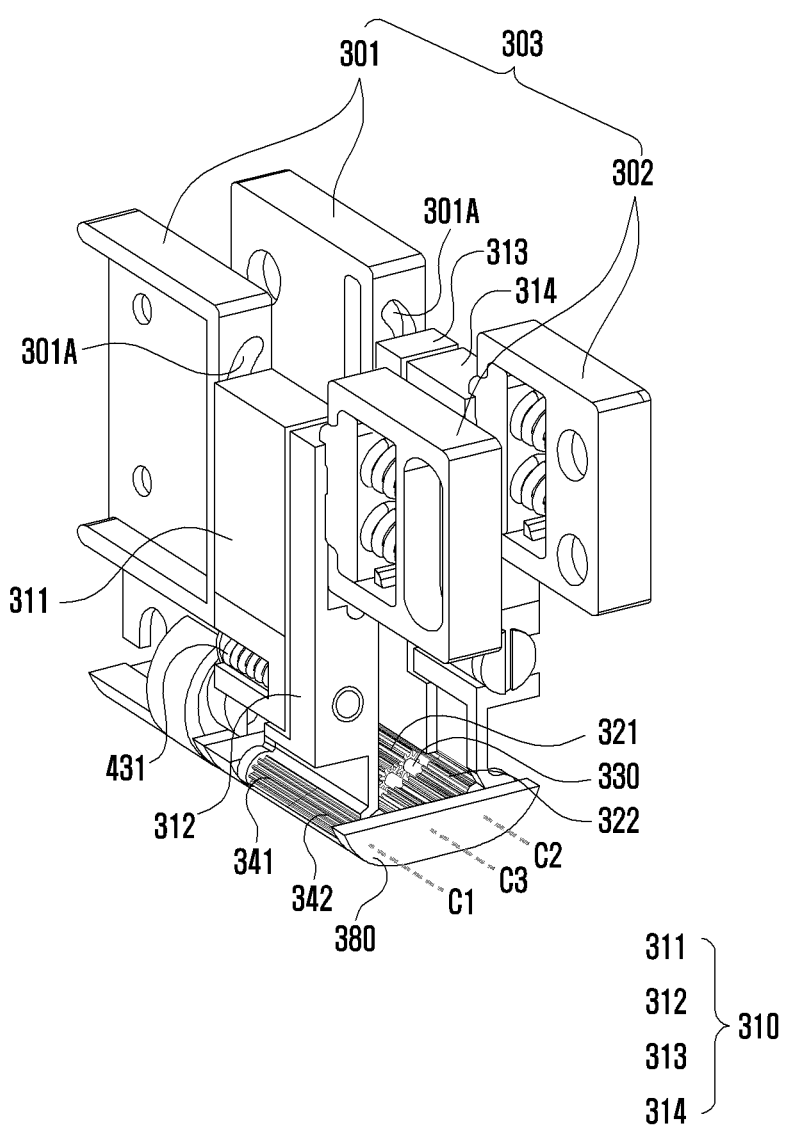
FIG. 4C is a perspective view showing a hinge structure and peripheral elements thereof in a folded state of electronic device according to various embodiments of the disclosure.

FIG. 3A is an exploded perspective view showing an electronic device according to an embodiment of the disclosure. FIG. 3B is a front view showing a state in which a display module is removed from an electronic device according to an embodiment of the disclosure. FIG. 4A is a plan view showing a hinge structure and peripheral elements thereof of an electronic device in an unfolded state according to an embodiment of the disclosure. FIG. 4B is a perspective view showing a hinge structure and peripheral elements thereof of an electronic device in an unfolded state according to an embodiment of the disclosure. FIG. 4C is a perspective view showing a hinge structure and peripheral elements thereof of an electronic device in a folded state according to an embodiment of the disclosure.

Referring to FIGS. 3A, 3B, 4A, 4B, and 4C, the first housing 210 and the second housing 220 may be foldably connected by a hinge structure 300. The hinge structure 300 may be disposed between the first housing 210 and the second housing 220 to allow folding between the first housing 210 and the second housing 220.

Referring to FIGS. 3A and 3B, the hinge structure 300 may include a plurality of hinge structures and be arranged between the first housing 210 and the second housing 220. However, the electronic device 200 according to the disclosure is not limited by the number of the hinge structures 300. The number of the hinge structures 300 to be included in the electronic device 200 may vary according to the size and load capacity of the hinge structure 300. According to various embodiments, a preferred number of hinge structures 300 may range between 1 and 4, e.g. between 2 and 3.

According to various embodiments, the hinge structure 300 may include a body part 310, a gear part 380, a gear member 340, and an idle gear 320. The body part 310 may include a first body 311, a second body 312, a third body 313, and a fourth body 314. In one embodiment, the gear member 340 and the idle gear 320 may be supported by the gear part 380. The gear part 380 may be understood as a gear box in which gears 320 and 340 are accommodated. In one embodiment, the gear part 380 may be disposed between the first housing 210 and the second housing 220.

According to various embodiments, the gear member 340 includes a first gear 341 and a second gear 342, and may further include a third gear 343, and a fourth gear 344. Furthermore the idle gear 320 includes a first idle gear 321 and a second idle gear 322. In one embodiment, the first body 311 may be connected to the first gear 341 to move together with the first gear 341, the second body 312 may be connected to the second gear 342 to move together with the second gear 342, the third body 313 may be connected to the third gear 343 to move together with the third gear 343, and the fourth body 314 may be connected to the fourth gear 344 to move together with the fourth gear 344.

According to various embodiments, the first body 311 and the second body 312 of the hinge structure 300 may be connected to the first housing 210, and the third body 313 and the fourth body 314 of the hinge structure 300 may be connected to the second housing 220. By a folding operation of the hinge structure 300, the first body and the second body 312 can move together with the first housing 210, and the third body 313 and the fourth body 314 can move together with the second housing 220.

In one embodiment, as illustrated in FIG. 4A and FIG. 4C, the hinge structure 300 may include a structure in which the first body 311 and the second body 312 can rotate with respect to the gear part 380 of the hinge structure 300. The first body 311 and the second body 312 can rotate around a hinge axis C1-C1 with respect to the gear part 380. The first body 311 and the second body 312 may be connected to the first housing 210. For example, the first body 311 and the second body 312 may be connected to a first auxiliary hinge part 301-1 and the first auxiliary hinge part 301-1 may be connected to the first housing 210, whereby the first body 311 and the second body 312 may be connected to the first housing 210 via the first auxiliary hinge part 301-1. When the first housing 210 rotates with respect to the second housing 220 by external force transmitted to the first housing 210 and/or the second housing 220, the first body 311 and the second body 312 can also rotate. The hinge axis C1-C1, which is a rotation axis of the first body 311 and the second body 312, may be understood as the hinge axis C1-C1 of the first gear 341 and the second gear 342 included in the gear member 340. The first gear 341 and the second gear 342 rotate with respect to the idle gear 320, and therefore the first body 311 the second body 312 can rotate around a hinge axis C1-C1 with respect to the gear part 380.

In addition, in one embodiment, as illustrated in FIG. 4A and FIG. 4C, the hinge structure 300 may include a structure in which the third body 313 and the fourth body 314 can rotate with respect to the gear part 380 of the hinge structure 300. The third body 313 and the fourth body 314 can rotate around a hinge axis C2-C2 with respect to the gear part 380. The third body 313 and the fourth body 314 may be connected to the second housing 220. For example, the third body 313 and the fourth body 314 may be connected to a second auxiliary hinge part 301-2 and the second auxiliary hinge part 301-2 may be connected to the second housing 220, whereby the third body 313 and the fourth body 314 may be connected to the second housing 220 via the second auxiliary hinge part 301-2. When the second housing 220 rotates with respect to the first housing 210 by external force transmitted to the first housing 210 and/or the second housing 220, the third body 313 and the fourth body 314 can also rotate. The hinge axis C2-C2, which is a rotation axis of the third body 313 and the fourth body 314, may be understood as the hinge axis C2-C2 of the third gear 343 and the fourth gear 344 included in the gear member 340. The third gear 343 and the fourth gear 344 rotate with respect to the idle gear 320, and therefore the third body 313 and the fourth body 314 can rotate around the hinge axis C2-C2 with respect to the gear part 380.

According to various embodiments, the electronic device 200 may include a stopping structure 303 for maintaining a folded state of the electronic device 200 in a state in which external force is not applied to the electronic device 200. For example, in a state of the first housing 210 and the second housing 220 of the electronic device 200 forming a predetermined angle, when external force is not applied thereto, the electronic device 200, by the stopping structure, can maintain the state in which the first housing 210 and the second housing 220 form a predetermined angle.

According to various embodiments, the stopping structure 303 may include an auxiliary hinge part 301 and a stopping-pressing part 302. The auxiliary hinge part 301 may include a first auxiliary hinge part 301-1 and a second auxiliary hinge part 301-2. The first auxiliary hinge part 301-1 and the second auxiliary hinge part 301-2 may be rotatably connected around a hinge axis C3-C3. In one embodiment, the hinge axis C3-C3 of the auxiliary hinge part 31 may coincide with a folding axis (e.g., the A-A of FIG. 2A) of an electronic device. Referring to FIG. 3B, the first auxiliary hinge part 301-1 may be connected to the first housing 210 and the second auxiliary hinge part 301-2 may be connected to the second housing 220, whereby the first auxiliary hinge part and the second auxiliary hinge part can move together with the first housing 210 and the second housing 220.

According to various embodiments, the auxiliary hinge part 301 may be disposed adjacent to the hinge structure 300. Referring to FIG. 4C, the hinge axis C3-C3 of the auxiliary hinge part 301 may not coincide with the hinge axes C1-C1 and C2-C2 of the hinge structure 300. The auxiliary hinge part 301 may include a rail groove 301A, and hinge structure 300 may include a rail protrusion 300A which is inserted into the rail groove 301A formed on the auxiliary hinge part 301. In the process of folding the electronic device 200, the rail protrusion 300A of the hinge structure 300 is movably inserted into the rail groove 301A formed on the auxiliary hinge part 301. Since the hinge axis C3-C3 of the auxiliary hinge part 301 and the hinge axes C1-C1 and C2-C2 of the hinge structure 300 do not coincide with each other, the rail protrusion 300A may be in contact with the inner surface of the rail groove 301A in the process of moving in a state of being inserted into the rail groove 301A.

According to various embodiments, the stopping-pressing part 302 may press the hinge structure 300 with respect to the auxiliary hinge part 301. When the hinge structure 300 is pressed to the auxiliary hinge part 301 by the stopping-pressing part 302 and external force greater than the friction force between the hinge structure 300 and the auxiliary hinge part 301 is not provided thereto, the hinge structure 300 cannot rotate any more. Therefore, the hinge structure 300 may stop in a state of not being provided with external force.

The stopping structure 303 described above is merely one embodiment, and the stopping structure 303 may employ various stopping structures configured to stop the hinge structure 300 which is not provided with external force.

Figure 5:
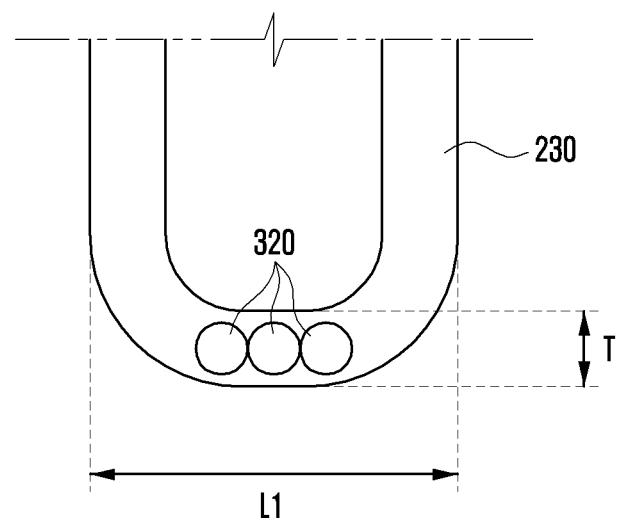
FIG. 5 is views for explaining a folded section of a display module according to various embodiments of the disclosure.
Figure 5:
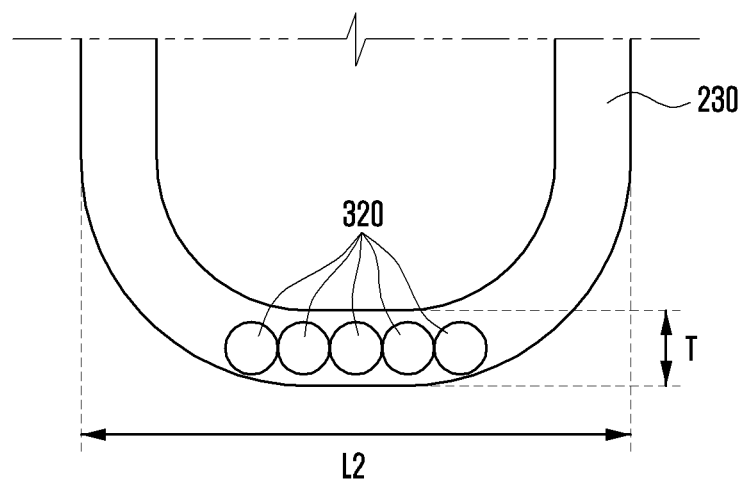
Figure 6A:
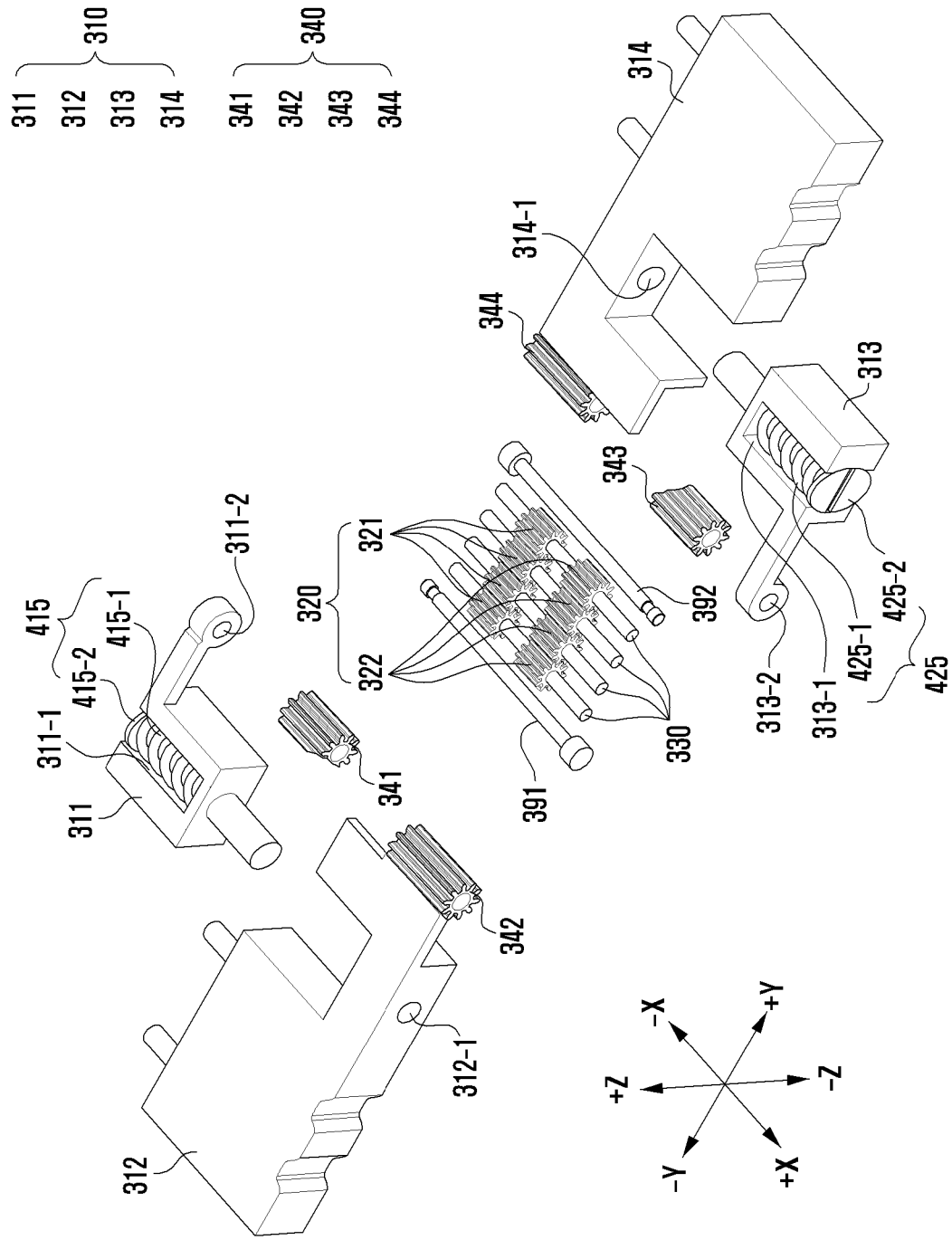
FIG. 6A is an exploded perspective view showing a hinge structure according to various embodiments of the disclosure.
Figure 6B:
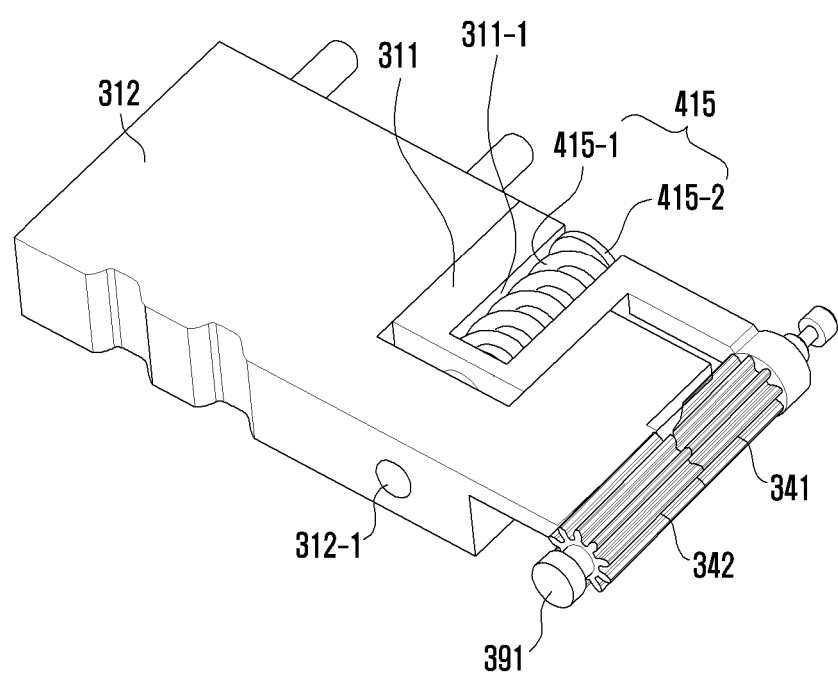
FIG. 6B is a perspective view showing a first body and a second body illustrated in FIG. 6A.
Figure 6C:
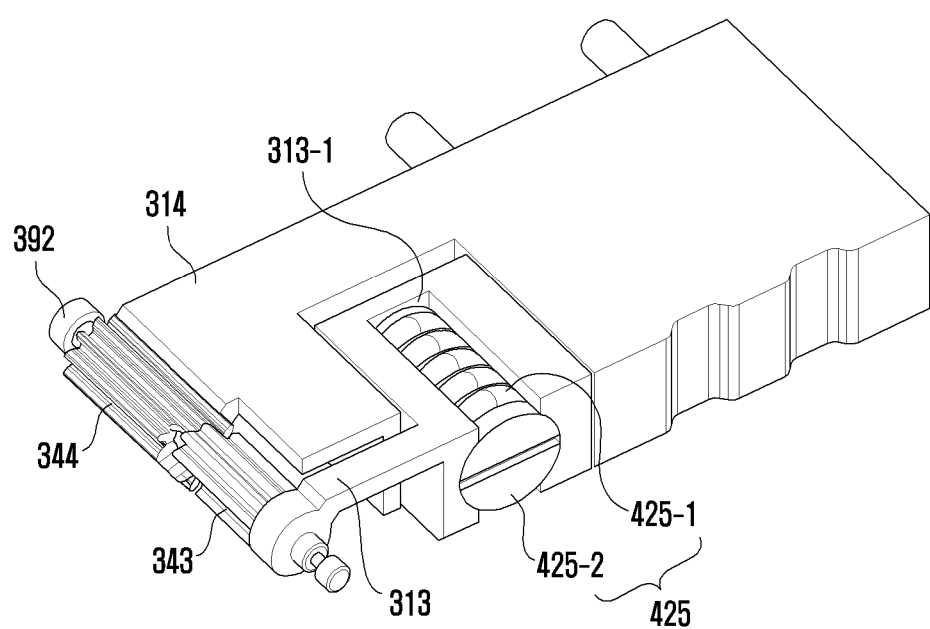
FIG. 6C is a perspective view showing a third body and a fourth body illustrated in FIG. 6A.

FIG. 5 is views for explaining a folded section of a display module according to various embodiments of the disclosure. FIG. 6A is an exploded perspective view showing a hinge structure according to various embodiments of the disclosure. FIG. 6B is a perspective view showing a first body and a second body illustrated in FIG. 6A. FIG. 6C is a perspective view showing a third body and a fourth body illustrated in FIG. 6A. The three-dimensional shape of the hinge structure may be referred to FIG. 4B and FIG. 4C.

Referring to FIGS. 5, 6A, 6B, and 6C, the hinge structure 300 may include the body part 310, the rotating shaft 330, the gear part 380, the idle gear 320, and the gear member 340.

Referring to FIG. 6A, the electronic device includes the rotating shaft 330. The first idle gear 321 rotates together with the rotating shaft 330. The second idle gear 322 rotates together with the rotating shaft 330 and be arranged side by side with the first idle gear 321. The first gear 341 engages with the first idle gear 321 from a first direction (e.g., the −Y direction of FIG. 6A) with respect to the rotating shaft 330. The second gear 342 engages with the second idle gear 322 from the first direction with respect to the rotating shaft 330. The first pressing member 415 moves the first gear 341 and the second gear 342 toward each other. The first interconnecting structure (e.g., the first interconnecting structure 410 of FIG. 7C) enable the first gear 341 and the second gear 342 to engage each other, and the first pressing member 415 moves the first gear 341 and the second gear 342 toward each other, the first gear 341 and the second gear 342 receive rotational forces in opposite directions.

According to various embodiments, the rotating shaft 330 of the hinge structure 300 is formed to extend in a direction (e.g., the X axis direction of FIG. 6A) side by side with a folding axis (e.g., the A-A axis of FIG. 2A) of an electronic device. The folding axis (e.g., the A-A folding axis of FIG. 2A) of the electronic device illustrated in FIG. 2A is side by side with the width direction (e.g., the X axis direction of FIG. 2A) of the electronic device, and thus the rotating shaft 330 of the hinge structure 300, which is applied to the electronic device, may extend in a direction (e.g., the X axis direction of FIG. 6A) side by side with the width direction of the electronic device.

According to various embodiments, the rotating shaft 330 of the hinge structure 300 may be provided with multiple rotating shafts, and the multiple rotating shafts are side by side with each other. For example, as illustrated in FIG. 6A, the rotating shafts 330 may be disposed along the Y axis direction. The rotating shaft 330 and the idle gear 320 coupled to the rotating shafts 330 are fixed in a folding process of the hinge structure 300, and thus a folded section (e.g., the folded section L1 and L2 of FIG. 5) of the display module 230 may be determined by the arrangement distance between the rotating shafts 330 and the diameter of the idle gear 320.

According to various embodiments, the arrangement distance between the rotating shafts 330 may be changed according to the diameter of the idle gears 320 fitted to the rotating shafts 330. The rotating shafts 330 may be arranged to have an interval which enables the idle gears 320 fitted to the rotating shafts 330 to be engaged with each other. For example, the folded section L2 in a case (e.g., the case of FIG. 5 view (b)) in which the curvature of a folding area of display module 230 is relatively small may be larger than the folded section L1 in a case (e.g., the case of FIG. 5 view (a)) in which the curvature thereof is relatively large. In this case, as illustrated in FIG. 5 view (b), a greater number of the idle gears 320 may be used. In another embodiment, the idle gears 320 having a large diameter may be used. However, if the idle gears 320 having a large diameter are used, the thickness T of a folding portion thereof may increase. If the number of the idle gears 320 having a small diameter increases, the thickness T of the folding portion may reduce. The relative position of the rotating shafts 330 does not change with respect to a display module in folding and unfolding operations of the electronic device 200. Therefore, it may be possible to adjust the curvature of a folding portion through adjusting the number of the rotating shafts 330 and the diameter of the idle gears 320 fitted to the rotating shafts 330.

According to various embodiments, the idle gear 320 may include the first idle gear 321 and the second idle gear 322. The first idle gear 321 may be installed between the first gear 341 and the fourth gear 344 to transmit power thereto. The second idle gear 322 may be installed between the second gear 342 and the third gear 343 to transmit power thereto. In one embodiment, one first idle gear 321 and one second idle gear 322 may be fitted to each of the rotating shaft 330, and the first idle gear 321 and the second idle gear 322 may be arranged side by side with each other. In another embodiment, the idle gear 320 may be integrally formed with the rotating shaft 330 to rotate together with the rotating shaft 330. The number of the first idle gear 321 and the second idle gear 322 may be variously changed. The number of the first idle gear 321 and the second idle gear 322 may be the same as the number of the rotating shaft 330. In order to allow the gear members 340 engaged with both ends of the idle gear 320 to be rotated in directions opposite to each other in folding and unfolding operations, the number of the first idle gear 321 and the second idle gear 322 may be an even number. An even number of idle gears allows for power transmission from the first gear to the fourth gear and from the second gear to the third gear, respectively, such that first gear and fourth gear as well as second gear and third gear rotate in opposite directions, respectively, without the need of any further intervening elements (gears). This is in particular useful for mutual folding and unfolding of the first and second housings 210, 220 via said first through fourth gears. The even number of idle gears may be 2, 4 or 6. The first idle gear 321 and the second idle gear 322 may rotate together with the rotating shaft 330.

According to various embodiments, the body part 310 may include the first body 311, the second body 312, the third body 313, and the fourth body 314. The shape of the body part 310 illustrated in FIG. 6A to FIG. 6C is merely an example, and the shape of the body part 310 is not limited as the shape illustrated in FIG. 6A to FIG. 6C. The shape of the body part 310 may be changed to various shapes corresponding to the overall structure of an electronic device including the hinge structure 300 and the structure of a portion in which the hinge structure 300 in an electronic device is arranged.

According to various embodiments, the hinge structure 300 may include the gear member 340 and the idle gear 320. In one embodiment, the gear member 340 and the idle gear 320 may be supported by the gear part 380. The gear part 380 may be understood as a gear box in which gears 320 and 340 are accommodated. In one embodiment, the gear part 380 may be installed between the first body 311 and the third body 313.

According to various embodiments, the gear member 340 may include the first gear 341, the second gear 342, the third gear 343, and the fourth gear 344, and the idle gear 320 may include a first idle gear 321 and a second idle gear 322. In one embodiment, the first body 311 may be connected to the first gear 341 to move together with the first gear 341, the second body 312 may be connected to the second gear 342 to move together with the second gear 342, the third body 313 may be connected to the third gear 343 to move together with the third gear 343, and the fourth body 314 may be connected to the fourth gear 344 to move together with the fourth gear 344. The idle gear 320 is merely the selection of a term for distinguishing same from the other gears 341, 342, 343 and 344 included in the hinge structure 300, and the function of gear is not limited due to itself. According to an embodiment, the idle gear 320 is adapted to transmit rotational force between the first and the fourth gear as well as between the second and the third gear. According to another embodiment, if only one housing (such as 210) is foldable using only first and second gears 341 and 342, the idle gear is adapted to rotate about the axis of the rotating shaft 330, and in this sense, transmits rotational force between the first gear 341 and the rotating shaft 330.

Firstly, referring to FIG. 6A and FIG. 6B, the first body 311 and the second body 312 will be described.

Referring to FIGS. 6A and 6B, the first body 311 and the second body 312 may be connected to each other. For example, the first body 311 and the second body 312 may be connected by a first pressing member 415. The first pressing member 415 may provide an elastic force to the first body 311 and the second body 312 in a direction in which the first body 311 and the second body 312 move toward each other. The elastic force provided from the first pressing member 415 may enable the first gear 341 connected to the first body 311 and the second gear 342 connected to the second body to move toward each other. In one embodiment, the rotational axis of the first gear 341 coincides with the rotational axis of the second gear 342 and the pressing member 415 is configured to provide a force such that the first gear 341 and the second gear 342 move towards one another.

According to various embodiments, the first pressing member 415 may include a first elastic body 415-1 and a first fixation member 415-2 (e.g., a bolt). In one embodiment, the first pressing member 415 may be disposed in a partition wall space 311-1 formed in the first body 311. As illustrated in FIG. 6B, the first pressing member 415 may include a first elastic body 415-1 fitted to the first fixation member 415-2. The first fixation member 415-2 may be connected to the second body 312 through the first body 311. For example, a part of the first fixation member 415-2 may be inserted into an opening 312-1 formed through the second body 312 so as to be coupled to the second body 312. In the process of coupling the first fixation member 415-2 thereto, the first elastic body 415-1 fitted to the first fixation member 415-2 may be elastically deformed by a part (e.g., the head of a bolt) of the first fixation member 415-2 and the partition wall space 311-1 formed in the first body 311. When the coupling is complete, the elastic force generated by the deformed first elastic body 415-1 may be applied to the partition wall space 311-1. The elastic force may be a force (e.g., the F of FIG. 7A) to cause the first body 311 and the second body 312 to move close to each other. The first body 311 and the second body 312 may be connected to the first gear 341 and the second gear 342, respectively. When the first body 311 and the second body 312 be moved close to each other by the elastic force provided from the first elastic body 415-1, the first gear 341 and the second gear 342 may be also pressed in a direction to be close to each other.

In addition, the first pressing member 415 may be changed to various elements capable of pressing the first gear 341 and the second gear 342 in a direction to be close to each other.

Secondly, the third body 313 and the fourth body 314 will be described. The third body 313 may correspond to the first body 311, and the fourth body 314 may correspond to the second body 312.

Referring to FIG. 6C, the third body 313 and the fourth body 314 may be connected to each other. For example, the third body 313 and the fourth body 314 may be connected by a second pressing member 425. The second pressing member 425 may provide an elastic force to the third body 313 and the fourth body 314 in a direction in which the third body 313 and the fourth body 314 move close to each other. By the elastic force provided from the second pressing member 425, the third gear 343 connected to the third body 313 and the fourth gear 344 connected to the fourth body 341 may be moved close to each other.

According to various embodiments, the second pressing member 425 may include a second elastic body 425-1 and a second fixation member 425-2 (e.g., a bolt). In one embodiment, the second pressing member 425 may be disposed in a partition wall space 313-1 formed in the third body 313. For example, as illustrated in FIG. 6C, the second pressing member 425 may include the second elastic body 425-1 fitted to the second fixation member 425-2. The second fixation member 425-2 may be connected to the fourth body 314 through the third body 313. For example, a part of the second fixation member 425-2 may be inserted into an opening 314-1 formed through the fourth body 314 so as to be coupled to the fourth body 314. In the process of coupling the second fixation member 425-2 thereto, the second elastic body 425-1 fitted to the second fixation member 425-2 may be elastically deformed by a part (e.g., the head of a bolt) of the second fixation member 425-2 and a partition wall space 313-1 formed in the third body 313. When the coupling is completed, the elastic force generated by the deformed second elastic body 425-1 may be applied to the partition wall space 313-1. The elastic force may be a force (e.g., the F of FIG. 7A) to cause the third body 313 and the fourth body 314 to move close to each other. The third body 313 and the fourth body 314 may be connected to the third gear 343 and the fourth gear 344, respectively. When the third body 313 and the fourth body 314 are moved close to each other by the elastic force provided from the second elastic body 425-1, the third gear 343 and the fourth gear 344 may be also pressed in a direction to be close to each other.

In addition, the second pressing member 425 may be changed to various elements capable of pressing the third gear 343 and the fourth gear 344 in a direction to be close to each other.

Figure 7A:
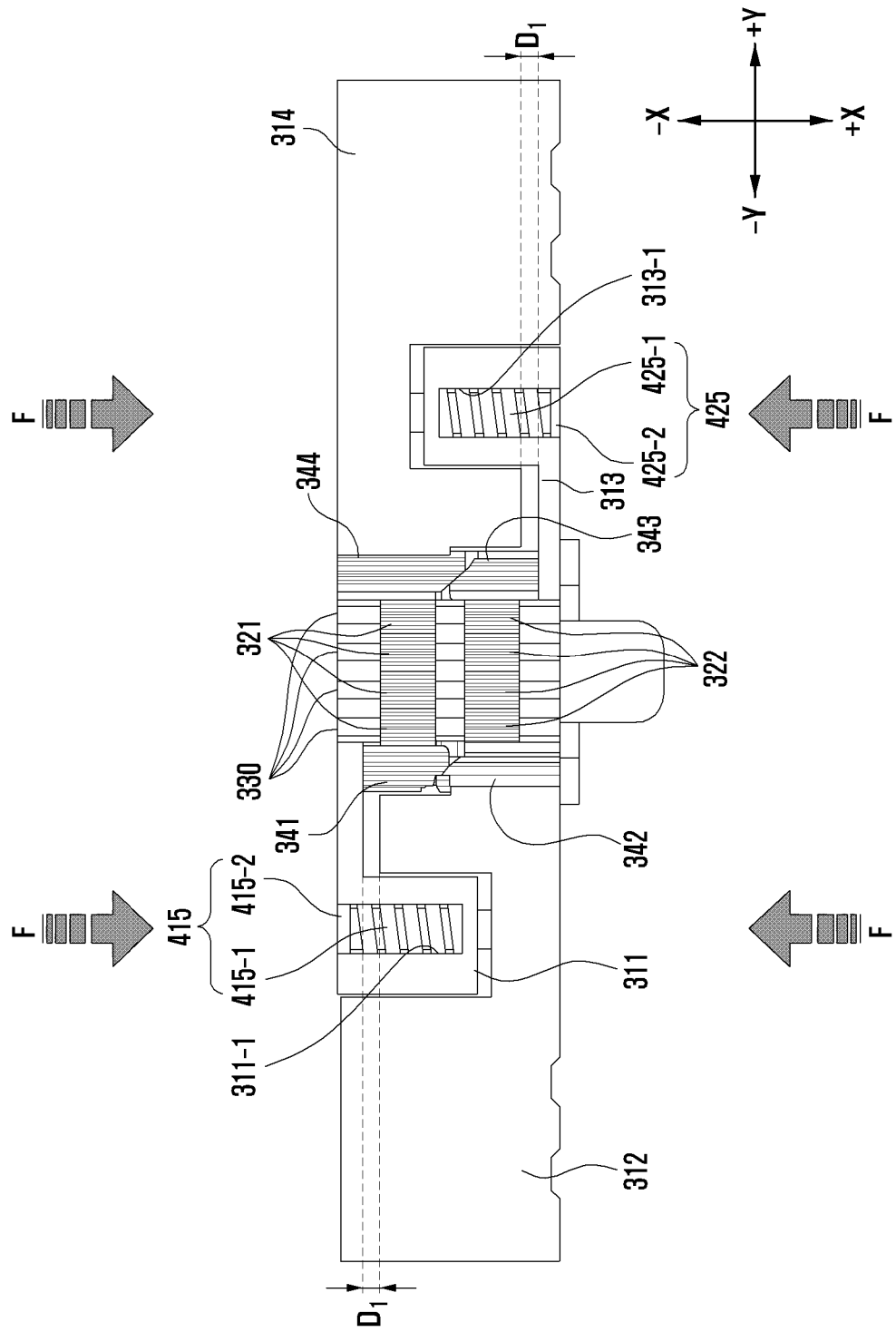
FIG. 7A is a plan view showing a hinge structure illustrated in FIG. 6A.
Figure 7B:
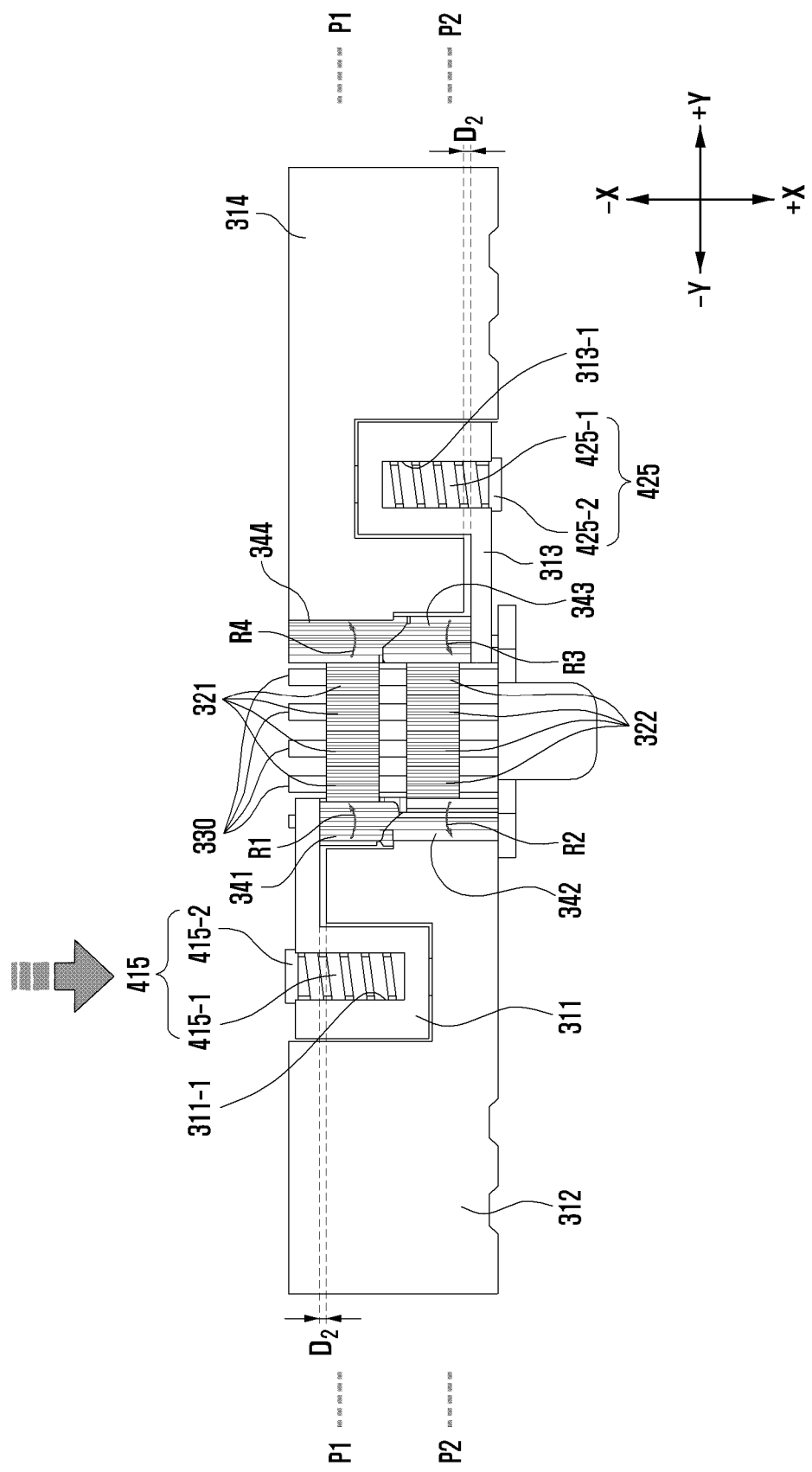
FIG. 7B is a plan view of a hinge structure for explaining an operation by a first pressing member and a second pressing member according to various embodiments of the disclosure.
Figure 7C:
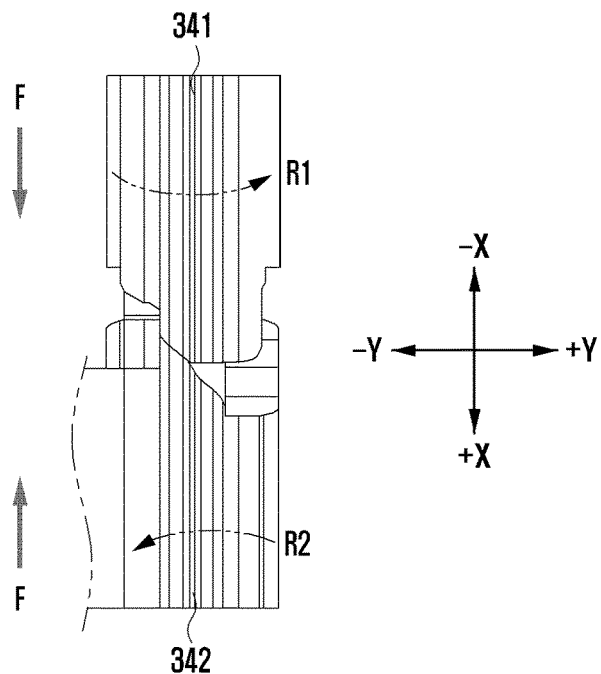
FIG. 7C is a view showing a first gear and a second gear according to various embodiments of the disclosure.
Figure 7C:
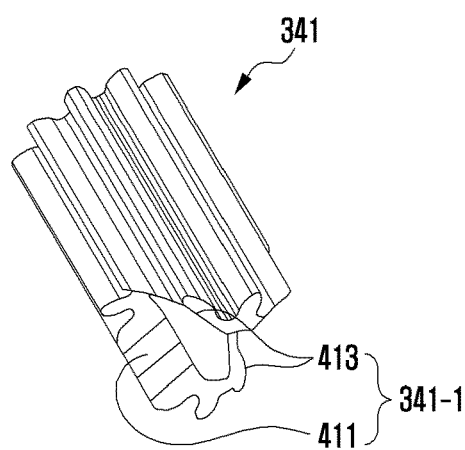
Figure 7C:
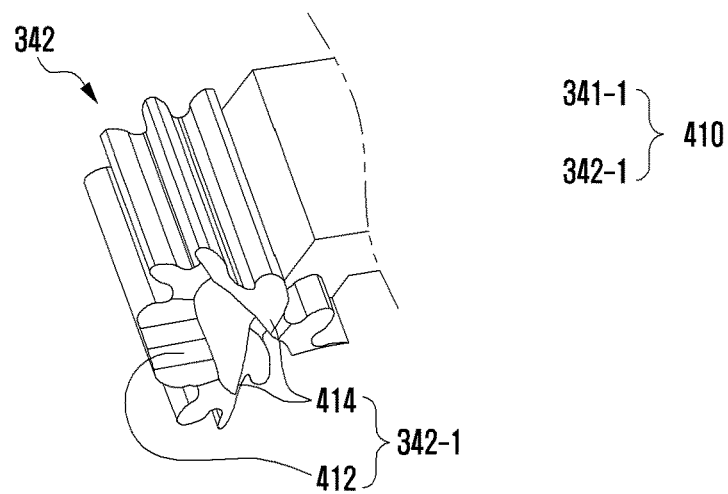
Figure 7D:
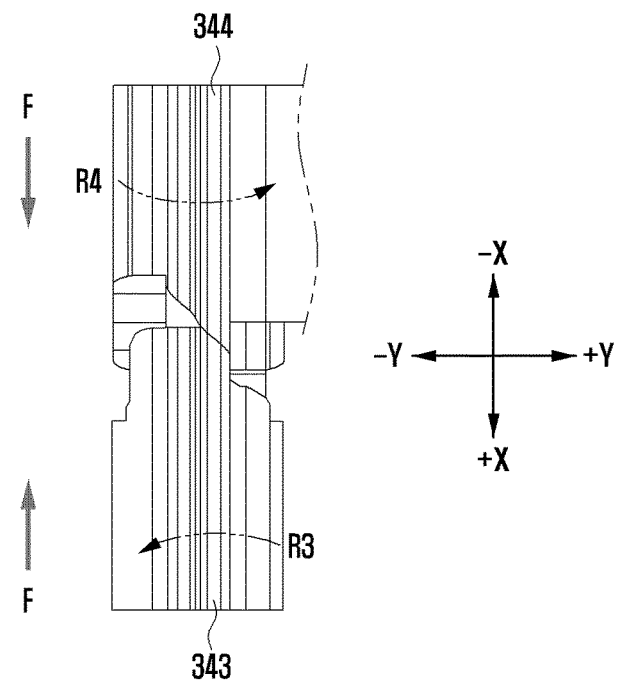
FIG. 7D is a view showing a third gear and a fourth gear according to various embodiments of the disclosure.
Figure 7D:
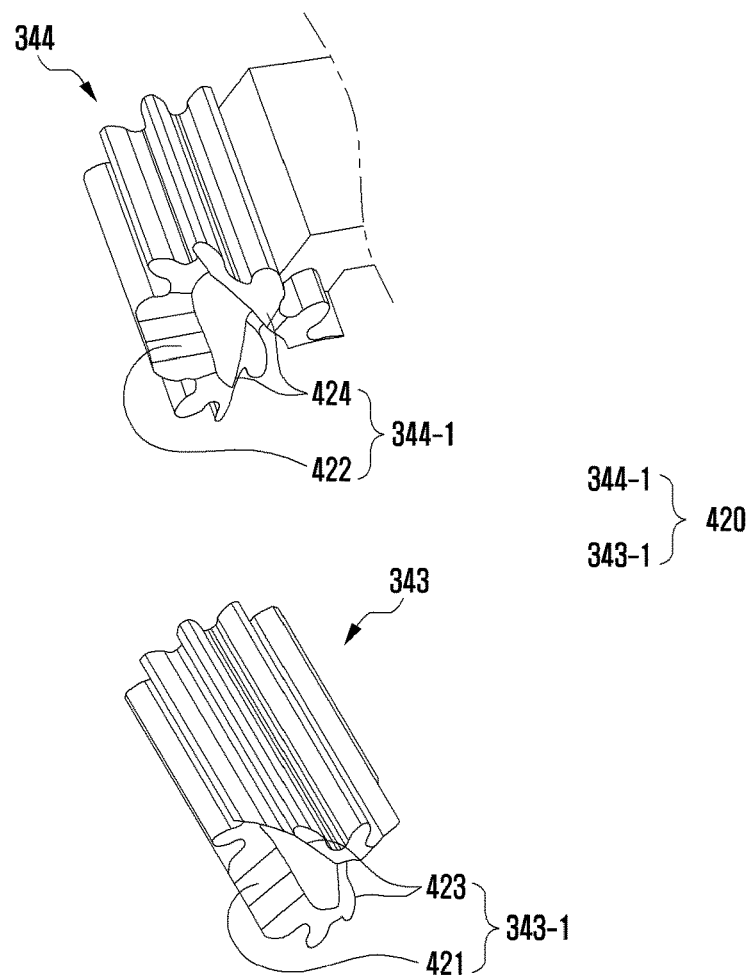

FIG. 7A is a plan view showing a hinge structure illustrated in FIG. 6A. FIG. 7B is a plan view of a hinge structure for explaining an operation by a first pressing member and a second pressing member according to various embodiments of the disclosure. FIG. 7C is a view showing a first gear and a second gear according to various embodiments of the disclosure. FIG. 7D is a view showing a third gear and a fourth gear according to various embodiments of the disclosure.

Referring to FIGS. 7A, 7B, and 7C, the first gear 341 and the second gear 342 will be described. According to various embodiments, the first gear 341 and the second gear 342 may be arranged to engage with the idle gear 320 from a first direction (e.g., the −Y direction of FIG. 7A). For example, as illustrated in FIG. 7A, the first gear 341 may be disposed to engage with the first idle gear 321 from the first direction, and the second gear 342 may be disposed to engage with the second idle gear 322 from the first direction. The first gear 341 and the second gear 342 may be engaged with each other to rotate together. Referring FIG. 6A, at least a part of a first shaft 391, which extends through the first gear 341 and the second gear 342, is inserted into the opening 311-2 formed through the first body 311. In one embodiment, the first shaft 391 may support the first gear 341 with respect to the first body 311.

According to various embodiments, the first gear 341 may be connected to the first body 311 so as to move together with the first body 311. In one embodiment, the first gear 341 may be formed at a part of the first body 311.

According to various embodiments, the second gear 342 may be connected to the second body 312 so as to move together with the second body 312. In one embodiment, the second gear 342 may be formed at a part of the second body 312.

According to various embodiments, the first gear 341 and the second gear 342 may, e.g. due to the pressing member 415, move towards one another until they contact each other and then the first gear 341 and the second gear 342 may be interconnected by a first interconnecting structure 410. The first interconnecting structure 410 may mean a structure which is formed between the first gear 341 and the second gear 342 such that the first gear 341 and the second gear 342 are engaged with each other and the first gear 341 and the second gear 342 are provided with rotational forces in opposite directions. For example, the first interconnecting structure 410 may include a first cam structure 341-1 formed at one end of the first gear 341 and a second cam structure 342-1 formed at one end of the second gear 342 at a position corresponding to the first cam structure 341-1. Alternatively, the interconnecting structure 410 may include alternative interconnecting means adapted to engage the gears with one another and disengage the gears from one another based on the relative lateral movement of the gears. Such alternative interconnecting means may include flange assemblies and the like.

According to various embodiments, the first cam structure 341-1 may include a first horizontal part 411 and a first inclined part 413. The second cam structure 342-1 may include a second horizontal part 412 and a second inclined part 414.

In one embodiment, the first horizontal part 411 may mean an area which is formed on the first gear 341 in a direction (e.g., the X axis direction of FIG. 7C) side by side with an extension direction (e.g., the X axis of FIG. 7A) of the rotating shaft 330. The second horizontal part 412 may also mean an area which is formed on the second gear 342 in a direction parallel to an extension direction of the rotating shaft 330. The first horizontal part 411 and the second horizontal part 412 may be engaged with each other. The first horizontal part 411 and the second horizontal part 412, which are formed side by side with the extension direction of the rotating shaft 330, are engaged with each other, and thus the first gear 341 and the second gear 342 may rotate together. In an embodiment, the shape, relative location and size of the first horizontal part 411 and the second horizontal part 412 correspond with each other such that both parts can reliably engage and connect with each other upon presence of a specific force from the pressing member 415 thereby causing rotation of the first and second gears 341 and 342 in the same rotational direction.

In one embodiment, the first inclined part 413 may mean an area which is formed on the first gear 341 in a direction to be inclined with respect to the extension direction (e.g., the X axis of FIG. 7A) of the rotating shaft 330. The second inclined part 414 may mean an area which is formed on the second gear 342 in a direction to be inclined with respect to the extension direction of the rotating shaft 330. The first inclined part 413 and the second inclined part 414 may be formed to have shapes corresponding to each other. As illustrated in FIG. 7B and FIG. 7C, when the first pressing member 415 presses (F) in a direction in which the first gear 341 and the second gear 342 move close to each other, rotational forces in opposite directions R1 and R2 may be applied to the first gear 341 and the second gear 342 by the first inclined part 413 and the second inclined part 414.

For example, as illustrated in FIG. 7A and FIG. 7B, when the first body 311 and the second body 312 are moved close to each other by the first pressing member 415, the distance between the first body 311 and the second body 312 may be reduced from D1 to D2. In this case, the first gear 341 can rotate in R1 direction and the second gear 342 can rotate in R2 direction.

According to various embodiments, the third gear 343 and the fourth gear 344 may be arranged to engage with the idle gear 320 from a second direction (e.g., the +Y direction of FIG. 7A) opposite to the first direction. For example, as illustrated in FIG. 7A, the third gear 343 may be disposed to engage with the first idle gear 321 from the second direction, and the fourth gear 344 may be disposed to engage with the second idle gear 322 from the second direction. The third gear 343 and the fourth gear 344 may be engaged with each other to rotate together. Referring FIG. 6A, at least a part of a second shaft 392, which extends through the third gear 343 and the fourth gear 344, is inserted into an opening 313-2 formed through the third body 313. In one embodiment, the second shaft 392 may support the third gear 343 with respect to the third body 313.

Secondly, referring to FIG. 7A, FIG. 7B, and FIG. 7D, the third gear 343 and the fourth gear 344 will be described.

According to various embodiments, the third gear 343 and the fourth gear 344 may be arranged to engage with the idle gear 320 from a second direction (e.g., the +Y direction of FIG. 7A) opposite to the first direction. For example, as illustrated in FIG. 7A, the third gear 343 may be disposed to engage with the first idle gear 321 from the second direction, and the fourth gear 344 may be disposed to engage with the second idle gear 322 from the second direction. The third gear 343 and the fourth gear 344 may be engaged with each other to rotate together. Referring FIG. 6A, at least a part of a second shaft 392, which extends through the third gear 343 and the fourth gear 344, is inserted into an opening 313-2 formed through the third body 313. In one embodiment, the second shaft 392 may support the third gear 343 with respect to the third body 313.

According to various embodiments, the third gear 343 may be connected to the third body part 313 so as to move together with the third body 313. In one embodiment, the third gear 343 may be formed at a part of the third body 313.

According to various embodiments, the fourth gear 344 may be connected to the fourth body part 314 so as to move together with the fourth body 314. In one embodiment, the fourth gear 344 may be formed at a part of the fourth body 314.

According to various embodiments, the third gear 343 and the fourth gear 344 may be interconnected by a second interconnecting structure 420. The second interconnecting structure 420 may mean a structure formed between the third gear 343 and the fourth gear 344 such that the third gear 343 and the fourth gear 344 are engaged with each other and the third gear 343 and the fourth gear 344 are provided with rotational forces in opposite directions. For example, the second interconnecting structure 420 may include a third cam structure 343-1 formed at one end of the third gear 343 and a fourth cam structure 344-1 formed at one end of the fourth gear 344 at a position corresponding to the third cam structure 343-1.

According to various embodiments, the third cam structure 343-1 may include a third horizontal part 421 and a third inclined part 423. The fourth cam structure 344-1 may include a fourth horizontal part 422 and a fourth inclined part 424.

In one embodiment, the third horizontal part 421 may mean an area which is formed on the third gear 343 in a direction (e.g., the X axis direction of FIG. 7D) side by side with the extension direction (e.g.: the X axis of FIG. 7A) of the rotating shaft 330. The fourth horizontal part 422 may also mean an area which is formed on the fourth gear 344 in a direction parallel to the extension direction of the rotating shaft 330. The third horizontal part 421 and the fourth horizontal part 422 may be engaged with each other. The third horizontal part 421 and the fourth horizontal part 422, which are formed side by side with the extension direction of the rotating shaft 330, are engaged with each other, and thus the third gear 343 and the fourth gear 344 may rotate together.

In one embodiment, the third inclined part 423 may mean an area which is formed on the third 343 in a direction to be inclined with respect to the extension direction (e.g., the X axis of FIG. 7A) of the rotating shaft 330. The fourth inclined part 424 may mean an area which is formed on the fourth gear 344 in a direction to be inclined with the extension direction of the rotating shaft 330. The third inclined part 423 and the fourth inclined part 424 may be formed to have shapes corresponding to each other. As illustrated in FIG. 7B and FIG. 7D, when the second pressing member 425 presses (F) in a direction in which the third gear 343 and the fourth gear 344 move close to each other, rotational forces in opposite directions R3 and R4 may be applied to the third gear 343 and the fourth gear 344 by the third inclined part 423 and the fourth inclined part 424.

For example, as illustrated in FIG. 7A and FIG. 7B, when the third body 313 and the fourth body 314 move close by the second pressing member 425, the distance between the third body 313 and the second body 314 may be reduced from D1 to D2. In this case, the third gear 343 can rotate in R3 direction and the fourth gear 344 can rotate in R4 direction.

According to various embodiments, the second pressing member 425 may press the third gear 343 and the fourth gear 344 in a direction in which the third gear 343 and the fourth gear 344 move close to each other. When the third gear 343 and the fourth gear 344 move close by the second pressing member 425, by the shape (e.g., the inclined parts 423 and 424 of FIG. 7D) of a portion in which the third gear 343 and the fourth gear 344 are engaged with each other, the third gear 343 may rotate in R3 direction of FIG. 7D and the fourth gear 344 may rotate in R4 direction of FIG. 7D. In addition, the third gear 343 and the fourth gear 344 may rotate together. For example, when the third gear 343 rotates, the fourth gear 344 may also rotate in the same direction as that of the third gear 343, and when the fourth gear 344 rotates, the third gear 343 may also rotate in the same direction as that of the fourth gear 344. As described above, the second interconnecting structure 420 may rotate the third gear 343 and the fourth gear 344 in directions opposite to each other, and rotate the third gear 343 and fourth gear 344 together.

According to one embodiment, due to a space (e.g., a backlash) of a portion in which gears (e.g., the idle gear 320, the first gear 341, the second gear 342, the third gear 343, and the fourth gear 344) are engaged, a free-play may occur between the first housing 210 and the second housing 220. Even if external force is applied to the first housing 210 and the second housing 220 in a folding direction or an unfolding direction thereof, a time delay that the first housing 210 and the second housing 220 are not immediately folded or unfolded may occur by a backlash.

According to various embodiments of the disclosure, pressing members (e.g., the first pressing member 415 and the second pressing member 425) may be configured to press gears (e.g., the first gear 341 and the second gear 342 and/or the third gear 343 and the fourth gear 344) against each other. The first interconnecting structure 410 and the second interconnecting structure 420, like cam structures, may convert motions (linear motions) of pressing gears against each other into motions (rotational motions) of providing rotational forces in opposite directions to gears. The backlash described above may be removed by rotational forces in opposite directions provided to gears. When gears rotating together in the same directions are provided with rotational forces in opposite directions, respectively, one of the gears may be provided with a rotational force in a main rotational direction thereof. When a backlash is removed from a gear provided with a rotational force in a direction which is the same as the main rotational direction, a gear engaged with the gear from which the backlash is removed can rotate together, and thus the first housing and the second housing can immediately rotate without a delay.

Figure 8A:
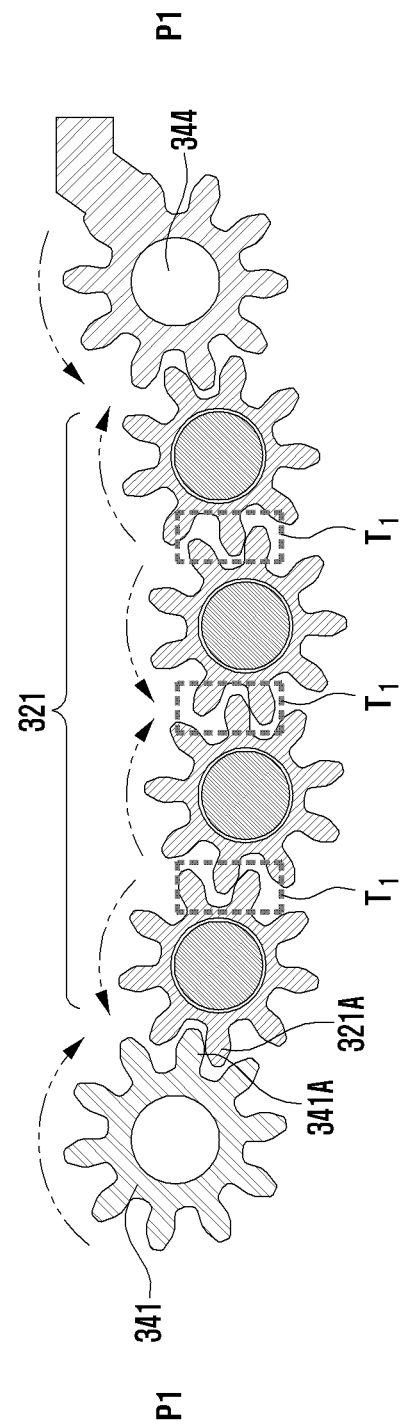
FIG. 8A and FIG. 8B are schematic views showing an operation of a gear member and an idle gear in a folding operation of an electronic device according to various embodiments of the disclosure.
Figure 8B:
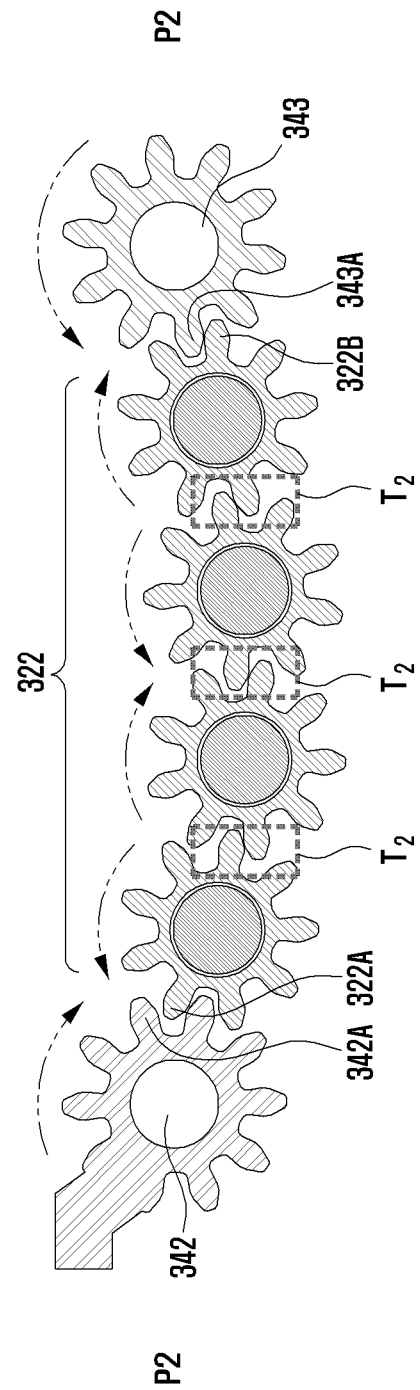
Figure 9A:
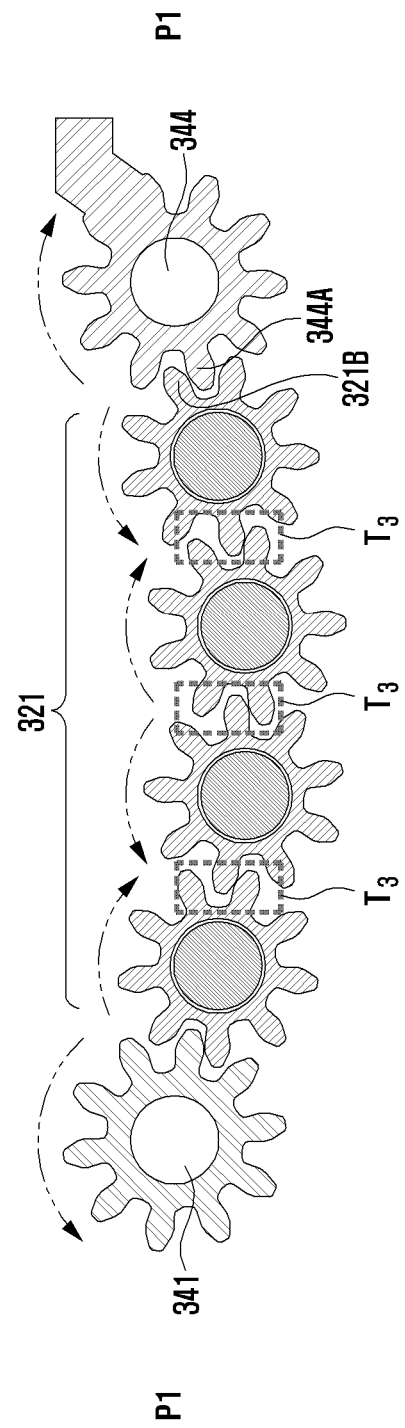
FIG. 9A and FIG. 9B are schematic views showing an operation of a gear member and an idle gear in an unfolding operation of an electronic device according to various embodiments of the disclosure.
Figure 9B:
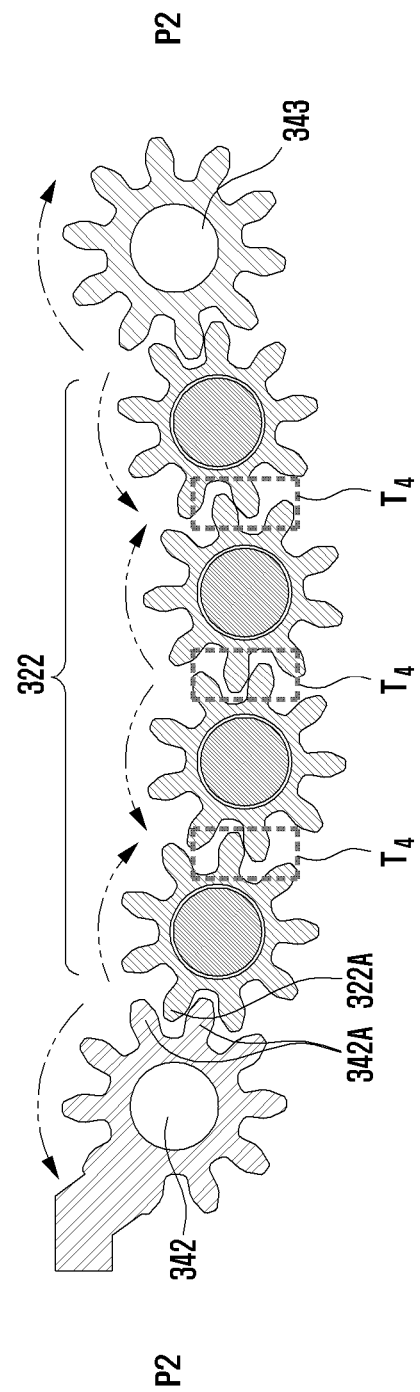

FIGS. 8A and 8B are schematic views showing an operation of a gear member and an idle gear in a folding operation of an electronic device according to various embodiments of the disclosure. FIG. 9A and FIG. 9B are schematics view showing an operation of a gear member and an idle gear in an unfolding operation of an electronic device according to various embodiments of the disclosure.

FIG. 8A and FIG. 9A are schematic views of the hinge structure in FIG. 7B taken along line P1-P1 and seen in the −X direction of FIG. 7B. FIG. 8B and FIG. 9B are schematic views of the hinge structure in FIG. 7B taken along line P2-P2 and seen in the −X direction of FIG. 7B.

Referring to FIGS. 8A, 8B, 9A, and 9B, there may be a predetermined gap between teeth of gears engaged therewith due to a deviation in a manufacturing process of a gear. A delay in the engagement between gears may occur due to the gap between teeth of gears. When there is a gap in the rotational direction of gears which rotate while being engaged, the gears may run idle until the gap is removed. In particular, when multiple gears are used, a long delay may occur between distant gears since the gap is sequentially removed. The long delay may occur when the rotational direction of gears changes from the forward direction to the backward direction. For example, the long delay may occur when an electronic device rotates back in an unfolding direction while rotating in a folding direction.

In the hinge structure 300 according to various embodiments of the disclosure, the first pressing member (e.g., the first pressing member 415 of FIG. 6B) and the first interconnecting structure (e.g., the first interconnecting structure 410 of FIG. 7C) provide rotational forces in opposite directions to the first gear 341 and the second gear 342, and the second pressing member (e.g., the second pressing member 425 of FIG. 6C) and the second interconnecting structure (e.g., the second interconnecting structure 420 of FIG. 7D) provide rotational forces in opposite directions to the third gear 343 and the fourth gear 344. Therefore, this delay can be reduced.

Hereinafter, in relation to the clockwise direction or the counterclockwise direction, it will be described with reference to FIGS. 8A and 8B and FIGS. 9A and 9B.

For example, referring to FIGS. 8A and 8B, in a folding operation of an electronic device, the first gear 341 and the second gear 342 may rotate in the clockwise direction. Meanwhile, referring to FIGS. 7B and 7C, the first pressing member and the first interconnecting structure may enable the first gear 341 to receive a clockwise rotational force (e.g., the force R1 of FIGS. 7B and 7C) and the second gear 342 to receive a counterclockwise rotational force (e.g., the force R2 of FIGS. 7B and 7C). The first gear 341 receives a rotational force in the clockwise direction by the first pressing member and the first interconnecting structure. Accordingly, as illustrated in FIG. 8A, a tooth 341A of the first gear 341 and a tooth 321A of the first idle gear 321 engaged with the first gear 341 may maintain a contact state in the clockwise direction. As a result, in a folding operation of an electronic device, a delay may not occur between the first gear 341 and the first idle gear 321 engaged therewith. In addition, the rotational force provided to the first gear 341 is transmitted to the first idle gear 321, and thus the first idle gears 321 may also maintain a state (refer to the portion T1 of FIG. 8A) in which teeth engage each other in the rotational direction that is a folding direction of an electronic device. Accordingly, in a folding operation of an electronic device, a delay may not occur between the first idle gears 321. The second gear 342 receives a counterclockwise rotational force by the first pressing member and the first interconnecting structure. As a result, as illustrated in FIG. 8B, in the clockwise rotation, a tooth 342A of the second gear 342 and a tooth 322A of the second idle gear 322 engaged with the second gear 342 may not be a contact state. However, the first gear 341 and the second gear 342 rotate together by the first interconnecting structure, and thus the second gear 342 may also rotate together with the first gear 341.

In the above, it has been described that the tooth 341A of the first gear 341 and the tooth 321A of the first idle gear 321 maintain a contact state in a clockwise direction. However, it can be understood that the distance between the tooth 341A of the first gear 341 and the tooth 321A of the first idle gear 321 is less than the distance between the tooth 342A of the second gear 342 and the tooth 322A of the second idle gear 322. In one embodiment, in the folding operation of the electronic device, the distance between the tooth 341A of the first gear 341 and the tooth 321A of the first idle gear 321 which is adjacent to the tooth 341A of the first gear 341 in a clockwise direction is less than the distance between the tooth 342A of the second gear 342 and the tooth 322A of the second idle gear 322 which is adjacent to the tooth 342A of the second gear 342 in a clockwise direction. The expression "tooth adjacent in a clockwise direction" may mean the closest teeth in a clockwise direction in that state.

In a folding operation of an electronic device, the third gear 343 and the fourth gear 344 may rotate in the counterclockwise direction. Referring to FIGS. 7B and 7D, the second pressing member and the second interconnecting structure may enable the third gear 343 to receive a counterclockwise rotational force (e.g., the R3 of FIGS. 7B and 7D) and the fourth gear 344 to receive a clockwise rotational force (e.g., the R4 of FIGS. 7B and 7D). The third gear 344 receives a counterclockwise rotational force by the second pressing member and the second interconnecting structure. Accordingly, as illustrated in FIG. 8B, a tooth 343A of the third gear 343 and a tooth 322B of the second idle gear 322 engaged with the third gear 343 may maintain a contact state in the counterclockwise direction. As a result, in a folding operation of an electronic device, a delay may not occur between the third gear 343 and the second idle gear 322 engaged therewith. The fourth gear 344 may rotate together with the third gear 343 by the second interconnecting structure. In addition, the rotational force provided to the third gear 343 is transmitted to the second idle gear 322, and thus the second idle gears 322 may also maintain a state (e.g., refer to the T2 portion of FIG. 8B) in which teeth engage each other in a folding direction of an electronic device. Accordingly, in a folding operation of an electronic device, a delay may not occur between the second idle gears 322.

In the above, it has been described that the tooth 343A of the third gear 343 and the tooth 322B of the second idle gear 322 maintain a contact state in a counterclockwise direction. However, it can be understood that the distance between the tooth 343A of the first gear 343 and the tooth 322B of the second idle gear 322 is less than the distance between the tooth of the fourth gear 344 and the tooth of the first idle gear 321. In one embodiment, in the folding operation of the electronic device, the distance between the tooth 343A of the third gear 343 and the tooth 322B of the second idle gear 322 which is adjacent to the tooth 343A of the third gear 343 in a counter clockwise direction is less than the distance between the tooth of the fourth gear 344 and the tooth of the first idle gear 321 which is adjacent to the tooth of the fourth gear 344 in a counterclockwise direction. The expression "tooth adjacent in a counterclockwise direction" may mean the closest teeth in a counterclockwise direction in that state.

For example, referring to FIGS. 9A and 9B, in an unfolding operation of an electronic device, the first gear 341 and the second gear 342 may rotate in the counterclockwise direction. The second gear 342 receives a counterclockwise rotational force (e.g., the R2 of FIGS. 7B and 7C) by the first pressing member and a first interconnecting structure. Accordingly, as illustrated in FIG. 9B, a tooth 342A of the second gear 342 and a tooth 322A of the second idle gear 322 engaged with the second gear 342 may always maintain a contact state in the counterclockwise direction. As a result, in an unfolding operation of an electronic device, a delay may not occur between the second gear 342 and the second idle gear 322 engaged with the second gear 342. In addition, the second gear 342 rotates together with the first gear 341 by the first interconnecting structure, and thus the first gear 341 may also immediately rotate in accordance with the rotation of the second gear 342. The rotational force provided from the second gear 342 to the second idle gear 322 may enable the second idle gears 322 to maintain a state (refer to the portion T4 of FIG. 9B) in which teeth engage with each other in an unfolding direction of an electronic device.

In the above, it has been described that the tooth 342A of the second gear 342 and the tooth 322A of the second idle gear 322 maintain a contact state in a counterclockwise direction. However, it can be understood that the distance between the tooth 342A of the second gear 342 and the tooth 322A of the second idle gear 322 is less than the distance between the tooth of the first gear 341 and the tooth of the first idle gear 321. In one embodiment, in the unfolding operation of the electronic device, the distance between the tooth 342A of the second gear 342 and the tooth 322A of the second idle gear 322 which is adjacent to the tooth 342A of the second gear 342 in a counterclockwise direction is less than the distance between the tooth of the first gear 341 and the tooth of the first idle gear 321 which is adjacent to the tooth of the first gear 341 in a counterclockwise direction. The expression "tooth adjacent in a counterclockwise direction" may mean the closest teeth in a counterclockwise direction in that state.

In an unfolding operation of an electronic device, the third gear 343 and the fourth gear 344 may rotate in the counterclockwise direction. The second pressing member and the second interconnecting structure illustrated in FIGS. 7B and 7D enable the fourth gear 344 to receive a clockwise rotational force (e.g., the R4 of FIGS. 7B and 7D). As illustrated in FIG. 9A, a tooth 344A of the fourth gear 344 and a tooth 321B of the first idle gear 321 engaged with the fourth gear 344 may maintain a contact state in the clockwise direction. Accordingly, in an unfolding operation of an electronic device, a delay may not occur between the fourth gear 344 and the first idle gear 321 engaged therewith. The fourth gear 344 may rotate together with the third gear 343 by the second interconnecting structure. The rotational force provided from the fourth gear 344 to the first idle gear 321 may enable the second idle gears 321 to a state (refer to the portion T3 of FIG. 9A) in which teeth engage with each other in an unfolding direction of an electronic device.

In the above, it has been described that the tooth 344A of the fourth gear 344 and the tooth 321B of the first idle gear 321 maintain a contact state in a clockwise direction. However, it can be understood that the distance between the tooth 344A of the fourth gear 344 and the tooth 321B of the first idle gear 321 is less than the distance between the tooth of the third gear 343 and the tooth of the second idle gear 322. In one embodiment, in the unfolding operation of the electronic device, the distance between the tooth 344A of the fourth gear 344 and the tooth 321B of the first idle gear 321 which is adjacent to the tooth 344A of the fourth gear 344 in a clockwise direction is less than the distance between the tooth of the third gear 343 and the tooth of the second idle gear 322 which is adjacent to the tooth of the third gear 343 in a clockwise direction. The expression "tooth adjacent in a clockwise direction" may mean the closest teeth in a clockwise direction in that state.

In the present invention, the expression "the pressing member for move the first gear and the second gear to be close" may be understood to mean the relative movement of the first gear and the second gear. In the first state, a gap may exist between the front end of first gear and the front end of second gear. When the pressing member moves the first gear and the second gear to be close, the front end of the first gear and the front end of second gear may contact each other. In addition, the expression "the opposite rotational force is provided to the first gear and the second gear according to the close movement the first gear and the second gear" may mean the first gear and the second gear rotate in opposite direction when the front ends of the first gear and the front end of the second gear are pressed while in contact and rotate in opposite directions.

According to various embodiments of the disclosure, the first gear 341 and the second gear 342 are pressed in a direction in which the first gear 341 and the second gear 342 move close to each other, and thus the first gear 341 and the second gear 342 may rotate in directions opposite to each other. As a result, the gap (e.g., a backlash) between the teeth of gears may be minimally maintained in a main rotational direction (e.g., in a folding operation of an electronic device, the clockwise direction with reference to FIGS. 8A and 8B, and in an unfolding operation of an electronic operation, the counterclockwise direction with reference to FIGS. 9A and 9B) of the first gear 341 and the second gear 342. Because of the reason, a free-play may be reduced between the first housing 210 and the second housing 220.

In addition, the third gear 343 and the fourth gear 344 are pressed in a direction in which the third gear 343 and the fourth gear 344 move close to each other, and thus may rotate in directions opposite to each other. As a result, the gap (e.g., a backlash) between the teeth of gears may be minimally maintained in a main rotational direction (e.g., in a folding operation of an electronic device, the counterclockwise direction with reference to FIGS. 8A and 8B, and in unfolding operation of an electronic operation, the clockwise direction with reference to FIGS. 9A and 9B) of the third gear 343 and the fourth gear 344. Because of the reason, a free-play may be reduced between the first housing 210 and the second housing 220.

An electronic device (e.g., the electronic device 200 of FIG. 2A) according to various embodiments of the disclosure may include: a first housing (e.g., the first housing 210 of FIG. 2C); a second housing (e.g., the second housing 220 of FIG. 2C); a hinge structure (e.g., the hinge structure 300 of FIG. 4B) foldably connecting the first housing and the second housing; and a display module (e.g., the display module 230 of FIG. 3A) arranged in the first housing and the second housing such that a partial area thereof is folded by folding of the first housing and the second housing. The hinge structure may include: a rotating shaft (e.g., the rotating shaft 330 of FIG. 4A); a first idle gear (e.g., the first idle gear 321 of FIG. 4A) rotating together with the rotating shaft; a second idle gear (e.g., the second idle gear 322 of FIG. 4A) rotating together with the rotating shaft and arranged to be side by side with the first idle gear; a first gear (e.g., the first gear 341 of FIG. 4A) engaged with the first idle gear from a first direction with respect to the rotating shaft; a second gear (e.g., the second gear 342 of FIG. 4A) engaged with the second idle gear from the first direction with respect to the rotating shaft; a first pressing member (e.g., the first pressing member 415 of FIG. 4A) configured to move the first gear and the second gear close to each other; and a first interconnecting structure (e.g., the first interconnecting structure 410 of FIG. 7C) formed between the first gear and the second gear such that the first gear and the second gear can be engaged with each other, the first interconnecting structure being formed between the first gear and the second gear such that, as the first gear and the second gear are moved close to each other by the first pressing member, the first gear and the second gear receive rotational forces in opposite directions.

The electronic device described in the previous paragraph, the first interconnecting structure of the hinge structure may include: a first structure in which a first horizontal part (e.g., the first horizontal part 411 of FIG. 7C) and a second horizontal part (e.g., the second horizontal part 4120 of FIG. 7C) formed on the first gear and the second gear in a direction parallel to an extension direction of the rotating shaft, respectively, engage with each other; and a second structure in which a first inclined part (e.g., the first inclined part 413 of FIG. 7C) and a second inclined part (e.g., the second inclined part 414 of FIG. 7C) formed on the first gear and the second gear in a direction to be inclined with respect to the extension direction of the rotating shaft, respectively, engage with each other.

The electronic device described in the previous two paragraphs, the hinge structure may further include: a first body (e.g., the first body 311 of FIG. 4A) connected to move together with the first gear; and a second body (e.g., the second body 312 of FIG. 4A) connected to move together with the second gear, wherein the first body and the second body of the hinge structure may be connected to the first housing.

The electronic device described in the previous three paragraphs, the first gear of the hinge structure may be integrally formed with the first body.

The electronic device described in the previous four paragraphs, the second gear of the hinge structure may be integrally formed with the second body.

The electronic device described in the previous five paragraphs, in a folding operation of the electronic device, a distance between a tooth of the first gear (e.g., the tooth 341A of FIG. 8A) and a tooth of the first idle gear (e.g., the tooth 321A of FIG. 8A) which is adjacent to the tooth of the first gear in a first rotation direction is less than a distance between a tooth of the second gear (e.g., the tooth 342A of FIG. 8B) and a tooth of the second idle gear (e.g., the tooth 322A of FIG. 8B) which is adjacent to the tooth of the second gear in the first rotation direction.

The electronic device described in the previous six paragraphs, in an unfolding operation of the electronic device, a distance between a tooth of the second gear (e.g., the tooth 342A of FIG. 9B) and a tooth of the second idle gear (e.g., the tooth 322A of FIG. 9B) which is adjacent to the tooth of the second gear in a second rotation direction is less than a distance between a tooth of the first gear and a tooth of the first idle gear which is adjacent to the tooth of the first gear in the second rotation direction.

The electronic device described in the previous seven paragraphs, the hinge structure may further include: a third gear (e.g., the third gear 343 of FIG. 4A) engaged with the second idle gear from a second direction opposite to the first direction with respect to the rotating shaft; a fourth gear (e.g., the fourth gear 344 of FIG. 4A) engaged with the first idle gear from the second direction with respect to the rotating shaft; a second pressing member (e.g., the second pressing member 425 of FIG. 4A) configured to move the third gear and the fourth gear close to each other; and a second interconnecting structure (e.g., the second interconnecting structure 420 of FIG. 7D), which may be formed between the third gear and the fourth gear such that the third gear and the fourth gear engage each other, the second interconnecting structure formed between the third gear and the fourth gear such that, as the third gear and the fourth gear move toward each other by the second pressing member, the third gear and the fourth gear receive rotational forces in opposite directions.

The electronic device described in the previous paragraphs, the second interconnecting structure of the hinge structure may include: a structure in which a third horizontal part (e.g., the third horizontal part 421 of FIG. 7D) and a fourth horizontal part (e.g., the fourth horizontal part 422 of FIG. 7D) formed on the third gear and the fourth gear in a direction parallel to the extension direction of the rotating shaft, respectively, engage with each other; and a structure in which a third inclined part (e.g., the third inclined part 423 of FIG. 7D) and a fourth inclined part (e.g., the fourth inclined part 424 of FIG. 7D) formed on the third gear and the fourth gear in a direction to be inclined with respect to the extension direction of the rotating shaft, respectively, engage with each other.

The electronic device described in the previous two paragraphs, the hinge structure may further include: a third body (e.g., the third body 313 of FIG. 4A) connected to move together with the third gear; and a fourth body (e.g., the fourth body 314 of FIG. 4A) connected to move together with the fourth gear, wherein the third body and the fourth body of the hinge structure may be connected to the second housing.

The electronic device described in the previous three paragraphs, the third gear of the hinge structure may be integrally formed with the third body.

The electronic device described in the previous four paragraphs, the fourth gear of the hinge structure may be integrally formed with the fourth body.

The electronic device described in the previous five paragraphs, in a folding operation of the electronic device, a distance between a tooth of the third gear (e.g., the tooth 343A of FIG. 8B) and a tooth of the second idle gear (e.g., the tooth 322B of FIG. 8B) which is adjacent to the tooth of the third gear in a second rotation direction is less than a distance between a tooth of the fourth gear and a tooth of the first idle gear which is adjacent to the tooth of the fourth gear in the second rotation direction.

The electronic device described in the previous six paragraphs, in an unfolding operation of the electronic device, a distance between a tooth of the fourth gear (e.g., the tooth 344A of FIG. 9A) and a tooth of the first idle gear (e.g., the tooth 321B of FIG. 9A) which is adjacent to the tooth of the fourth gear in a first rotation direction is less than a distance between a tooth of the third gear and a tooth of the second idle gear which is adjacent to the tooth of the third gear in the first rotation direction.

The electronic device described in the previous fourteen paragraphs, the first idle gear and the second idle gear include a plurality of gears each other, and the plurality of gears is an even number of 2 to 6.

Embodiments of the disclosure disclosed in the specification and the drawings are merely specific examples presented to easily describe the technical content according to embodiments of the disclosure and to help understanding of the disclosure, and are not intended to limit the scope of embodiments of the disclosure. Accordingly, it should be interpreted that the scope of various embodiments of the disclosure includes not only embodiments disclosed herein, but also all changed or modified forms derived based on the technical idea of various embodiments of the disclosure.

The invention claimed is:

1. An electronic device comprising:
a first housing;
a second housing;
a first auxiliary hinge part connected to the first housing;
a second auxiliary hinge part connected to the second housing; and
a hinge structure configured to rotatably connect the first auxiliary hinge part and the second auxiliary hinge part, wherein the hinge structure comprises:
an idle gear,
a first gear configured to engage with the idle gear in a first direction with respect to the idle gear,
a second gear configured to engage with the idle gear in a second direction opposite to the first direction with respect to the idle gear,
a first body disposed in the first direction with respect to the idle gear, integrally formed with the first gear to rotate with respect to the idle gear according to a rotation of the first gear, and slidably connected to the first auxiliary hinge part, and
a second body disposed in the second direction with respect to the idle gear, integrally formed with the second gear to rotate with respect to the idle gear according to a rotation of the second gear, and slidably connected to the second auxiliary hinge part.

2. The electronic device of claim 1,
wherein a rotating shaft of the first auxiliary hinge part and a rotating shaft of the first gear are different from each other, and
wherein a rotating shaft of the second auxiliary hinge part and a rotating shaft of the second gear are different from each other.

3. The electronic device of claim 2,
wherein the first body is connected to the first auxiliary hinge part such that a relative position between the first auxiliary hinge part and the first body changes when the first housing and the second housing are folded or unfolded, and
wherein the second body is connected to the second auxiliary hinge part such that a relative position between the second auxiliary hinge part and the second body changes when the first housing and the second housing are folded or unfolded.

4. The electronic device of claim 1,
wherein the first auxiliary hinge part is configured to slide with respect to the first body when a rail protrusion formed on the first body is inserted in a rail groove formed on the first auxiliary hinge part such that the first housing and the second housing are folded or unfolded, and
wherein the second auxiliary hinge part is configured to slide with respect to the second body when a rail protrusion formed on the second body is inserted in a rail groove formed on the second auxiliary hinge part such that the first housing and the second housing are folded or unfolded.

5. The electronic device of claim 4, wherein the rail protrusion is configured to slide in a state of being received in the rail groove according to a shape of the rail groove when the first housing and the second housing are folded or unfolded.

6. The electronic device of claim 1, wherein a cam structure is formed on at least one of an end of the first gear and an end of the second gear.

7. The electronic device of claim 6, further comprising a pressing member configured to press the cam structure in an axis direction of at least one of the first gear or the second gear.

8. The electronic device of claim 1,
wherein the idle gear comprises even-numbered gears, and
wherein the first gear and the second gear are configured to rotate in directions opposite to each other when the first housing and the second housing are folded or unfolded.

9. An electronic device comprising:
a housing which comprises a first housing and a second housing and is configured to be foldable;
a flexible display supported by the first housing and the second housing; and
a hinge structure connected to the first housing and the second housing, wherein the hinge structure comprises:
a first cam structure configured to provide a first rotational force to the first housing,
a second cam structure configured to provide a second rotational force to the second housing, a first body connected between the first cam structure and the first housing, a first gear being formed on a portion of the first body, and a cam structure being formed at an end of the first gear and configured to engage with the first cam structure, a second body connected between the second cam structure and the second housing, a second gear being formed on a portion of the second body, and a cam structure being formed at an end of the second gear and configured to engage with the second cam structure, a first pressing member configured to provide an elastic force to the first cam structure in a direction parallel to a rotating shaft of the first gear, the first cam structure and the cam structure formed on the first gear being configured to engage with and disengage from each other in response to the elastic force, a second pressing member configured to provide an elastic force to the second cam structure in a direction parallel to a rotating shaft of the second gear, the second cam structure and the cam structure formed on the second gear being configured to engage with and disengage from each other in response to the elastic force, and an idle gear positioned between the first gear and the second gear, a first operation of the first gear and a second operation of the second gear being configured to interwork with each other via the idle gear.

10. The electronic device of claim 9, wherein the hinge structure further comprises:

a first auxiliary hinge part connected between the first body and the first housing, the first auxiliary hinge part being configured to slide with respect to the first body according to folding and unfolding of the housing, and the first auxiliary hinge part having a rail groove formed thereon to be used for sliding with respect to the first body; and a second auxiliary hinge part connected between the second body and the second housing, the second auxiliary hinge part being configured to slide with respect to the second body according to folding and unfolding of the housing, and the second auxiliary hinge part having a rail groove formed thereon to be used for sliding with respect to the second body.

11. A hinge structure for rotatably connecting a first housing and a second housing, the hinge structure comprising:

a first auxiliary hinge part connected to the first housing;
a second auxiliary hinge part connected to the second housing;
an idle gear;
a first gear configured to engage with the idle gear in a first direction with respect to the idle gear;
a second gear configured to engage with the idle gear in a second direction opposite to the first direction with respect to the idle gear;
a first body disposed in the first direction with respect to the idle gear, integrally formed with the first gear to rotate with respect to the idle gear according to a rotation of the first gear, and slidably connected to the first auxiliary hinge part; and
a second body disposed in the second direction with respect to the idle gear, integrally formed with the second gear to rotate with respect to the idle gear according to a rotation of the second gear, and slidably connected to the second auxiliary hinge part.

12. The hinge structure of claim 11,
wherein a rotating shaft of the first auxiliary hinge part and a rotating shaft of the first gear are different from each other, and
wherein a rotating shaft of the second auxiliary hinge part and a rotating shaft of the second gear are different from each other.

13. The hinge structure of claim 12,
wherein the first body is connected to the first auxiliary hinge part such that a relative position between the first auxiliary hinge part and the first body changes when the first housing and the second housing are folded or unfolded, and
wherein the second body is connected to the second auxiliary hinge part such that a relative position between the second auxiliary hinge part and the second body changes when the first housing and the second housing are folded or unfolded.

14. The hinge structure of claim 11,
wherein the first auxiliary hinge part is configured to slide with respect to the first body when a rail protrusion formed on the first body is inserted in a rail groove formed on the first auxiliary hinge part such that the first housing and the second housing are folded or unfolded, and
wherein the second auxiliary hinge part is configured to be slide with respect to the second body when a rail protrusion formed on the second body is inserted in a rail groove formed on the second auxiliary hinge part such that the first housing and the second housing are folded or unfolded.

15. The hinge structure of claim 14, wherein the rail protrusion is configured to slide in a state of being received in the rail groove according to a shape of the rail groove when the first housing and the second housing are folded or unfolded.

16. The hinge structure of claim 11, wherein a cam structure is formed on at least one of an end of the first gear and an end of the second gear.

17. The hinge structure of claim 16, further comprising a pressing member configured to press the cam structure in an axis direction of at least one of the first gear or the second gear.

18. The hinge structure of claim 11,
wherein the idle gear comprises even-numbered gears, and
wherein the first gear and the second gear are configured to rotate in directions opposite to each other when the first housing and the second housing are folded or unfolded.

19. An electronic device comprising:
a first auxiliary hinge part connected to a first housing and a second auxiliary hinge part connected to a second housing, each of the first auxiliary hinge part and the second auxiliary hinge part comprising an opening to receive a pivot shaft; and
a hinge structure configured to foldably connect the first housing and the second housing,
wherein the hinge structure comprises:
a first body and a second body, each of the first body and the second body comprising a pivot shaft engaged with a respective opening of the first auxiliary hinge part and the second auxiliary hinge part,
a first gear and a second gear configured to rotate the first body and the second body, respectively, along parallel axes with a bending radius of curvature based on a distance between the first gear and the second gear, and a first interconnecting structure formed between the first gear and the second gear to enable the first gear and the second gear to engage each other.

20. The electronic device of claim 19, further comprising:
a pressing member (415, 425); and
a first cam and a second cam (341, 343) configured to rotate the first gear and the second gear (342, 344), respectively, in response to the pressing member exerting a force against at least one of the first gear or the second gear.

21. The electronic device of claim 20, wherein the first cam and the second cam (341, 343) are formed on an end of the first gear and an end of the second gear (342, 344), respectively.

22. The electronic device of claim 19, wherein the pivot shaft (300A) of each of the first body and the second body comprise an axis that extends substantially parallel to an axis of the first gear and the second gear (342, 344), respectively.

* * * * *